United States Patent
Hegde et al.

(10) Patent No.: US 11,636,075 B2
(45) Date of Patent: *Apr. 25, 2023

(54) SYSTEM AND METHOD FOR PROVIDING DIRECT ACCESS TO A SHARDED DATABASE

(71) Applicant: Oracle International Corporation, Redwood Shores, CA (US)

(72) Inventors: Vidya Hegde, Bangalore (IN); Jean de Lavarene, Versailles (FR); Douglas Surber, Orinda, CA (US); Mark Dilman, Sunnyvale, CA (US); Leonid Novak, Redwood City, CA (US); Wei Ming Hu, Palo Alto, CA (US); Ashok Shivarudraiah, San Mateo, CA (US); Tong Zhou, Merrick, NY (US); Ilya Taranov, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 432 days.

This patent is subject to a terminal disclaimer.

(21) Appl. No.: 15/133,972

(22) Filed: Apr. 20, 2016

(65) Prior Publication Data

US 2016/0306854 A1 Oct. 20, 2016

Related U.S. Application Data

(60) Provisional application No. 62/198,958, filed on Jul. 30, 2015, provisional application No. 62/150,188, (Continued)

(51) Int. Cl.
*G06F 16/00* (2019.01)
*G06F 16/22* (2019.01)
(Continued)

(52) U.S. Cl.
CPC .......... *G06F 16/22* (2019.01); *G06F 16/2282* (2019.01); *G06F 16/24552* (2019.01);
(Continued)

(58) Field of Classification Search
CPC .......... G06F 17/30492; G06F 17/30339; G06F 16/22; G06F 16/27; G06F 16/252; G06F 16/2282; G06F 16/24552; G06F 16/24557
See application file for complete search history.

(56) References Cited

U.S. PATENT DOCUMENTS 7,475,055 B2    1/2009    Hutchison et al.
9,787,551 B2    10/2017    Newton et al.
(Continued)

FOREIGN PATENT DOCUMENTS

CN    10567301    1/2005
CN    101777047    7/2010
(Continued)

OTHER PUBLICATIONS

International Search Report and Written Opinion issued by the European Patent Office for PCT patent application No. PCT/US2016/028420, dated Jul. 25, 2016, 11 pages.
(Continued)

*Primary Examiner* — Aleksandr Kerzhner
*Assistant Examiner* — Loan T Nguyen
(74) *Attorney, Agent, or Firm* — Tucker Ellis LLP

(57) ABSTRACT

In accordance with an embodiment, described herein are systems and methods for providing direct access to a sharded database. A shard director provides access by software client applications to database shards. A connection pool (e.g., a Universal Connection Pool, UCP) and database driver (e.g., a Java Database Connectivity, JDBC, component) can be configured to allow a client application to provide a shard key, either during connection checkout or at
(Continued)

a later time; recognize shard keys specified by the client application; and enable connection by the client application to a particular shard or chunk. The approach enables efficient re-use of connection resources, and faster access to appropriate shards.

20 Claims, 12 Drawing Sheets

Related U.S. Application Data filed on Apr. 20, 2015, provisional application No. 62/150,191, filed on Apr. 20, 2015.

(51) Int. Cl.
*G06F 16/25* (2019.01)
*G06F 16/2455* (2019.01)
*G06F 16/27* (2019.01)

(52) U.S. Cl.
CPC ...... *G06F 16/24557* (2019.01); *G06F 16/252* (2019.01); *G06F 16/27* (2019.01)

(56) References Cited

U.S. PATENT DOCUMENTS

| | | | |
|---|---|---|---|
| 9,817,726 | B2 | 11/2017 | Lee et al. |
| 10,545,935 | B2* | 1/2020 | Hegde ............... G06F 16/22 |
| 2004/0205057 | A1 | 10/2004 | Hutchison et al. |
| 2005/0038801 | A1 | 2/2005 | Colrain et al. |
| 2012/0233228 | A1 | 9/2012 | Barton et al. |
| 2013/0047230 | A1 | 2/2013 | Krishnan et al. |
| 2013/0103729 | A1* | 4/2013 | Cooney ......... G06F 16/24568 707/831 |
| 2014/0101100 | A1 | 4/2014 | Hu et al. |
| 2014/0122510 | A1* | 5/2014 | Namkoong ......... G06F 16/27 707/755 |
| 2014/0324910 | A1* | 10/2014 | de Lavarene ....... G06F 9/5011 707/781 |
| 2015/0026213 | A1 | 1/2015 | Hegde et al. |
| 2015/0237157 | A1* | 8/2015 | Wang ............... H04L 41/0668 714/4.11 |
| 2015/0317340 | A1* | 11/2015 | Sardina ........... G06F 17/30362 707/803 |
| 2015/0348172 | A1* | 12/2015 | Vasantham ......... G06F 15/161 705/26.81 |
| 2016/0203061 | A1* | 7/2016 | Lee ................. G06F 11/1451 714/19 |
| 2017/0103098 | A1* | 4/2017 | Hu ................... G06F 16/252 |

FOREIGN PATENT DOCUMENTS

| | | |
|---|---|---|
| CN | 103365929 | 10/2013 |
| CN | 103605727 | 2/2014 |
| EP | 2637111 | 9/2013 |
| JP | 2006259790 | 9/2006 |

OTHER PUBLICATIONS

United States Patent and Trademark Office, Office Action dated May 14, 2018 for U.S. Appl. No. 15/133,979, 8 Pages.
United States Patent and Trademark Office, Office Action dated Mar. 12, 2019 for U.S. Appl. No. 15/133,979, 13 Pages.
Wikipedia, "Partition", version of page published on Jul. 9, 2014, retrieved Jan. 29, 2021 from https://en.wikipedia.org/w/index.php?title=Partition_(database)&oldid=616221891, 3 pages.
European Patent Office, Summons to attend oral proceedings pursuant to Rule 115(1) EPC mailed Mar. 4, 2021 for EP Application No. 16720268.8, 10 pages.
Indian Patent Office, First Examination Report dated Jul. 27, 2020 for Indian Patent Application No. 201747026656, 7 pages.
Chinese Patent Office, Office Action dated Mar. 3, 2020 for Chinese Patent Application No. 201680014244.2, 10 pages.
Bergsten Hans, JavaServer Pages, Second Edition and First Edition, O'Reilly Japan, Inc., May 31, 2003, pp. 513-522, 10 pages.
United States Patent and Trademark Office, Notice of Allowance dated Sep. 9, 2019 for U.S. Appl. No. 15/133,979, 6 pages.
Japanese Patent Office, Japanese Patent Application No. 2017-550489, mailed Sep. 17, 2019, 5 pages.
Communication pursuant to Article 94(3) EPC, European Patent Application No. 16720268.8, dated Oct. 22, 2019, 10 pages.
United States Patent and Trademark Office, Notice of Allowance and Fee(s) Due dated Apr. 14, 2022 for U.S. Appl. No. 16/724,909, 8 pages.
United States Patent and Trademark Office, Office Communication dated Sep. 2, 2021 for U.S. Appl. No. 16/724,909, 9 pages.

* cited by examiner

| Service Topology Map (ServiceTopologyMap) |
|---|
| serviceToInstanceMap: HashMap <String, Set <OracleInstance>><br>instanceToServiceMap: HashMap <OracleInstance, Set <String>> |
| getInstancesForService (service: String): Set <OracleInstance><br>getServicesOnInstance (instance: oracleInstance)<br>hasService (service: String): boolean<br>hasInstance (instance: OracleInstance): boolean<br>addService (service: String, instance: OracleInstance)<br>removeService (service: String)<br>removeInstance (instance: OracleInstance)<br>removeServiceMember (service: String, instance: Instance) |

Service Topology Class 360

*FIGURE 12*

SYSTEM AND METHOD FOR PROVIDING DIRECT ACCESS TO A SHARDED DATABASE

CLAIM OF PRIORITY

This application claims the benefit of priority to U.S. Provisional Patent Applications titled "SYSTEM AND METHOD FOR PROVIDING DIRECT ACCESS TO A SHARDED DATABASE", Application No. 62/150,191, filed Apr. 20, 2015; "SYSTEM AND METHOD FOR PROVIDING DIRECT ACCESS TO A SHARDED DATABASE", Application No. 62/198,958, filed Jul. 30, 2015; and "SYSTEM AND METHOD FOR PROVIDING ACCESS TO A SHARDED DATABASE USING A CACHE AND A SHARD TOPOLOGY", Application No. 62/150,188, filed Apr. 20, 2015; and is related to U.S. Patent Application titled "SYSTEM AND METHOD FOR PROVIDING ACCESS TO A SHARDED DATABASE USING A CACHE AND A SHARD TOPOLOGY", application Ser. No. 15/133,979, filed Apr. 20, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and databases, and are particularly related to systems and methods for providing access to a sharded database.

BACKGROUND

Modern web-oriented software applications face increasing challenges with regard to scalability, including the need to handle extremely large volumes of data. For example, within a mobile chat system, the database tables that are needed to process messages have grown in size dramatically, such that the volume of a single table can become a limiting factor in the scalability of a particular application. A common approach to addressing this type of problem is the use of sharding, in which data is presented as multiple smaller databases or shards. These are some examples of the types of environments in which embodiments of the invention can be used.

SUMMARY

In accordance with an embodiment, described herein are systems and methods for providing direct access to a sharded database. A shard director or listener operates to provide access by software client applications to database shards. A connection pool (e.g., a Universal Connection Pool, UCP) and database driver (e.g., a Java Database Connectivity, JDBC, component) can be configured to allow a client application to provide a shard key, either during connection checkout or at a later time; recognize shard keys specified by the client application; and enable connection by the client application to a particular shard or chunk. The approach enables efficient re-use of connection resources, and faster access to appropriate shards.

In accordance with an embodiment, the system enables access to a sharded database using a cache and a shard topology. A shard-aware client application connecting to a sharded database can use a connection pool (e.g., UCP), to store or access connections to different shards or chunks of the sharded database within a shared pool. As new connections are created, a shard topology layer can be built at the database driver layer, which learns and caches shard key ranges to locations of shards. The shard topology layer enables subsequent connection requests from a client application to use a fast key path access to the appropriate shard or chunk.

In accordance with an embodiment, if there are no available connections in the connection pool to the particular shard or chunk, then an attempt can be made to repurpose an existing available connection to another chunk, and re-use that connection.

The above and additional embodiments are described in further detail below.

BRIEF DESCRIPTION OF THE FIGURES

FIG. 12 illustrates a service topology class design, in accordance with an embodiment.

DETAILED DESCRIPTION

Figure 1:
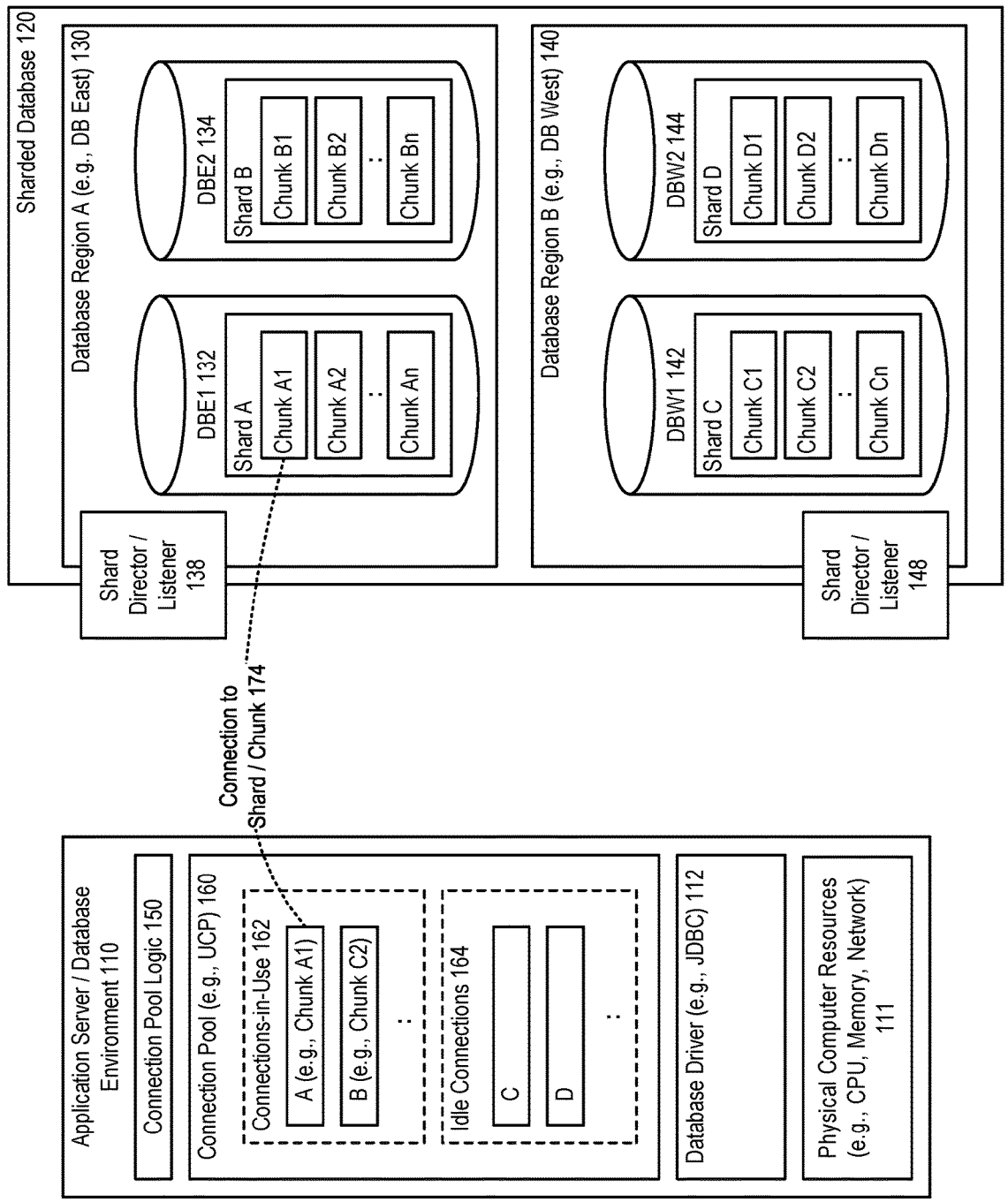
FIG. 1 illustrates a system for enabling direct access to a sharded database, in accordance with an embodiment.

As described above, modern web-oriented software applications face increasing challenges with regard to scalability, including the need to handle extremely large volumes of data, such that the volume of a single table can become a limiting factor in the scalability of a particular application.

A common approach to addressing this type of problem is the use of sharding, in which data is presented as multiple smaller databases or shards. To provide support for such environments, in accordance with various embodiments, described herein are systems and methods for providing access to a sharded database.

Sharded Databases

In accordance with an embodiment, sharding is a database-scaling technique which uses a horizontal partitioning of data across multiple independent physical databases. The part of the data which is stored in each physical database is referred to as a shard. From the perspective of a software client application, the collection of all of the physical databases appears as a single logical database.

In accordance with an embodiment, a database table can be partitioned using a shard key (SHARD_KEY), for example as one or more columns that determine, within a particular shard, where each row is stored. A shard key can be provided in a connect string or description as an attribute of connect data (CONNECT_DATA).

Shard grouping, an additional level of sharing which provides a form of user-controlled data partitioning using a shard group key (SHARDGROUP_KEY), can optionally be used in distributing data across database groups (DB-GROUPS), for example:

```
(DESCRIPTION=(...) (CONNECT_DATA= (SERVICE_NAME=ORCL
(SHARD_KEY=...)
(SHARDGROUP_KEY=...)))
```

Examples of shard keys can include a VARCHAR2, CHAR, DATE, NUMBER, or TIMESTAMP in the database. It is the responsibility of the user to present a shard key compliant with the national language support formatting specified in the database. In accordance with an embodiment, a sharded database can also accept connections without a shard key or shard group key.

In accordance with an embodiment, to reduce the impact of resharding on system performance and data availability, each shard can be subdivided into smaller pieces or chunks. Each chunk acts as a unit of resharding that can be moved from one shard to another. Chunks also simplify routing, by adding a level of indirection to the shard key mapping.

For example, each chunk can be automatically associated with a range of shard key values. A user-provided shard key can be mapped to a particular chunk, and that chunk mapped to a particular shard. If a database operation attempts to operate on a chunk that is not existent on a particular shard, then an error will be raised. When shard groups are used, each shard group is a collection of those chunks that have a specific value of shard group identifier.

In accordance with an embodiment, a shard-aware client application can work with sharded database configurations, including the ability to connect to one or multiple database shards in which the data is partitioned based on one or more sharding methods. Each time a database operation is required, the client application can determine the shard to which it needs to connect.

In accordance with an embodiment, a sharding method can be used to map shard key values to individual shards. Different sharding methods can be supported, for example: hash-based sharding, in which a range of hash values is assigned to each chunk, so that upon establishing a database connection the system applies a hash function to a given value of the sharding key, and calculates a corresponding hash value which is then mapped to a chunk based on the range to which that value belongs; range-based sharding, in which a range of shard key values is assigned directly to individual shards; and list-based sharding, in which each shard is associated with a list of shard key values.

In accordance with an embodiment, a database can also be associated with one or more supershards. The association of a supershard with a database allows an additional constraint to be put in the records stored in the database. For example, within a particular database table, if a location is identified as a shard group identifier, then a sharding method can be used to ensure that a data center where records for a particular customer are stored is the one closest in proximity to the location specified by that customer.

In accordance with an embodiment, resharding is the process of redistributing data across the shards of a sharded database. Resharding is required in some situations, for example when shards are added to or removed from a sharded database; to eliminate skew in the data or workload distribution across shards; or to satisfy application requirements, for example that certain data must be stored together.

In accordance with an embodiment, a global data services (GDS) component can be used to provide a scalability, availability, and manageability framework for use with multi-database environments. GDS can operate with one or more global service manager (GSM) listeners, to present a multi-database configuration to clients as a single logical database, including support for failover, load balancing, and centralized management for database services. For example, a client request can be routed to an appropriate database based on availability, load, network latency, replication lag, or other parameters. A GDS pool provides a set of replicated databases that offer a global service, so that, for example, the databases in a GDS pool can be located in multiple data centers across different regions. A sharded GDS pool contains the shards of a sharded database, together with their replicas. From the perspective of a database client, a sharded GDS pool appears as a single sharded database.

1. Direct Access to Sharded Databases

In accordance with an embodiment, described herein are systems and methods for providing direct access to a sharded database. A shard director or listener component operates to provide access by software client applications to database shards. A connection pool (e.g., a Universal Connection Pool, UCP) and database driver (e.g., a Java Database Connectivity, JDBC, component) can be configured to allow a client application to provide a shard key, either during connection checkout or at a later time; recognize shard keys specified by the client application; and enable connection by the client application to a particular shard or chunk. The approach enables efficient re-use of connection resources, and faster access to appropriate shards.

FIG. 1 illustrates a system for enabling direct access to a sharded database, in accordance with an embodiment.

As illustrated in FIG. 1, in accordance with an embodiment of an application server or database environment 110 which includes physical computer resources (e.g., processor/CPU, memory, network) 111, and a database driver (e.g., a JDBC component) 112, a shard-aware client application connecting to a sharded database 120 can use a connection pool component 160 (e.g., UCP) with associated connection pool logic 150, to store or access connections to different shards or chunks of the sharded database, within a shared pool.

In the exemplary environment illustrated in FIG. 1, the sharded database can comprise a first database region A (here indicated as DB East, DBE) 130, including sharded database instances "DBE 1" 132, with shard A stored as chunks A1, A2, . . . An; and "DBE 2" 134, with shard B stored as chunks B1, B2, . . . Bn.

As further illustrated in FIG. 1, a second database region B (here indicated as DB West, DBW) 140, includes sharded database instances "DBW 1" 142, with shard C stored as chunks C1, C2, . . . Cn; and "DBW 2" 144, with shard D stored as chunks D1, D2, . . . Dn.

In accordance with an embodiment, each database region or group of sharded database instances can be associated with a shard director or listener component (e.g., a GSM listener, or another type of listener) that operates to provide access by software client applications to database shards. For example, a shard director or listener 138 can be associated with first database region A, and another shard director or listener 148 can be associated with second database region B.

In accordance with an embodiment, a client application can provide one or more shard keys to the connection pool (e.g., UCP) during the connection request; and, based on the one or more shard keys, the connection pool can route the connection request to the correct or appropriate shard.

In accordance with an embodiment, the connection pool maintains a plurality of connections-in-use 162, and idle connections 164. The connection pool can identify a connection to a particular shard or chunk by its shard keys, and allow re-use of a connection when a request for a same shard key is received from a client.

For example, as illustrated in FIG. 1, a connection to a chunk A1 can be used to connect 174 to that chunk. If there are no available connections in the pool to the particular shard or chunk, the system can attempt to repurpose an existing available connection to another shard or chunk, and re-use that connection. The data distribution across the shards and chunks in the database can be made transparent to the user, which also minimizes the impact of re-sharding of chunks on the user.

Figure 2:
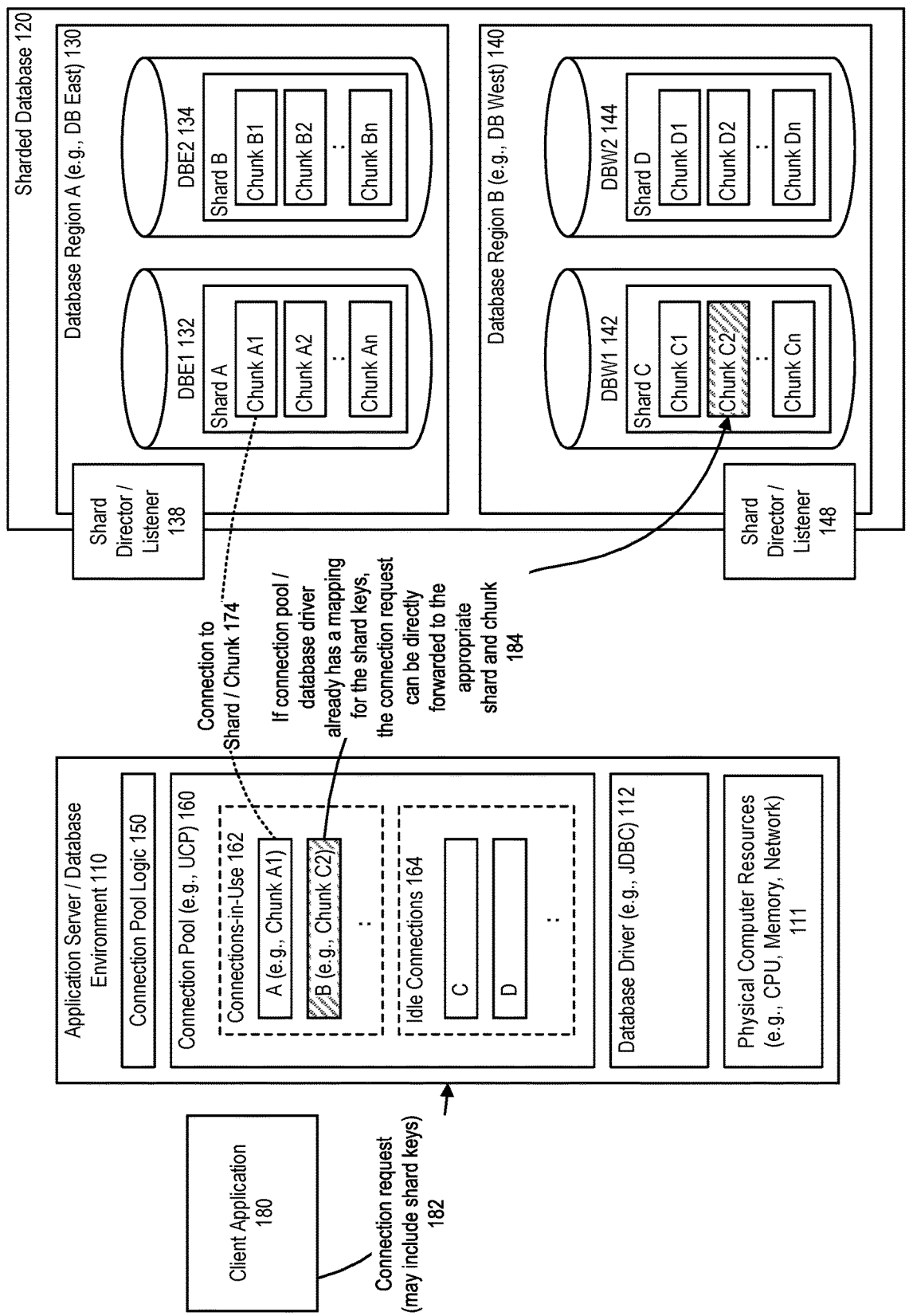
FIG. 2 further illustrates a system for enabling direct access to a sharded database, in accordance with an embodiment.

FIG. 2 further illustrates a system for enabling direct access to a sharded database, in accordance with an embodiment.

As illustrated in FIG. 2, when a shard-aware client application 180 provides one or more shard keys 182 to the connection pool (e.g., UCP), in association with a connection request; then if the connection pool or database driver already has a mapping for the shard keys, the connection request can be directly forwarded to the appropriate shard and chunk 184, in this example to chunk C2.

Figure 3:
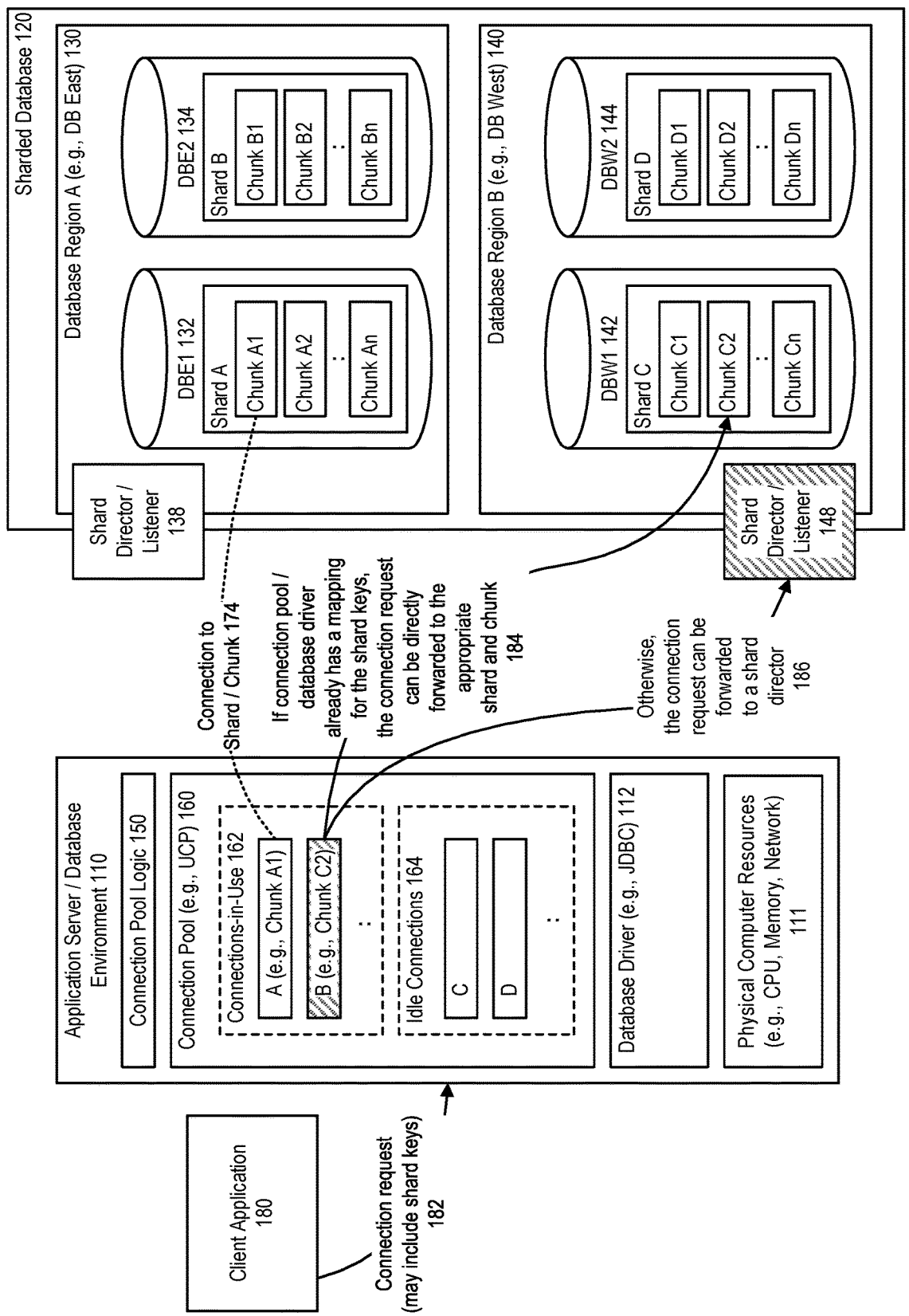
FIG. 3 further illustrates a system for enabling direct access to a sharded database, in accordance with an embodiment.

FIG. 3 further illustrates a system for enabling direct access to a sharded database, in accordance with an embodiment.

As illustrated in FIG. 3, when a shard-aware client application does not provide a shard key in association with the connection request, or if the connection pool (e.g., UCP) or database driver (e.g., JDBC) does not have a mapping for a provided shard key; then the connection request can be forwarded to an appropriate shard director or listener (e.g., a GDS/GSM listener) 186, including in this example to the shard director or listener associated with the second database region B.

Figure 4:
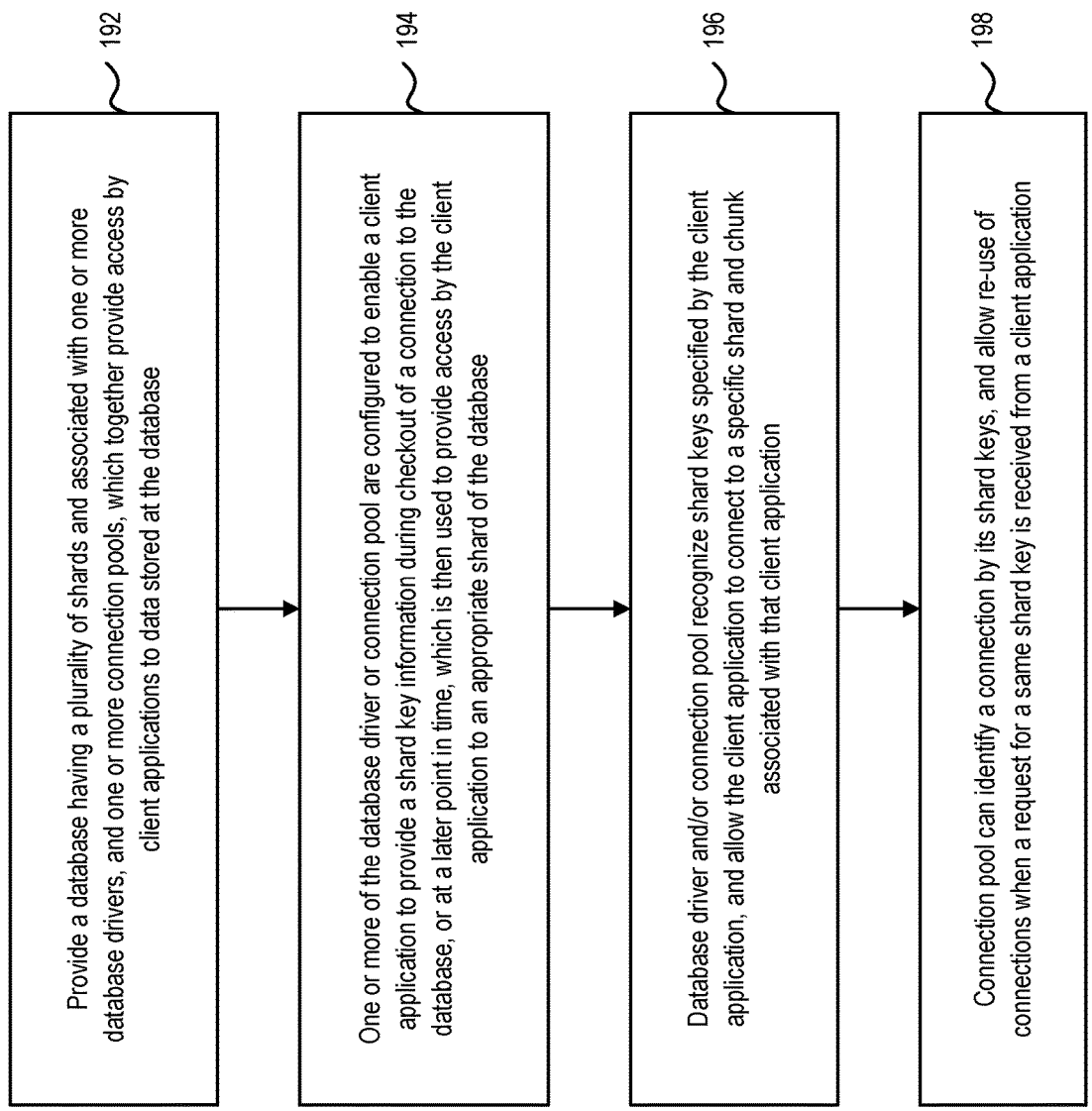
FIG. 4 illustrates a process for enabling direct access to a sharded database, in accordance with an embodiment.

FIG. 4 illustrates a process for enabling direct access to a sharded database, in accordance with an embodiment.

As illustrated in FIG. 4, at step 192, a database is provided having a plurality of shards and associated with one or more database drivers, and one or more connection pools, which together provide access by client applications to data stored at the database.

At step 194, one or more of the database driver or connection pool are configured to enable a client application to provide a shard key information during checkout of a connection to the database, or at a later point in time, which is then used to provide access by the client application to an appropriate shard of the database.

At step 196, the database driver and/or connection pool recognize shard keys specified by the client application, and enable the client application to connect to a specific shard and chunk associated with that client application.

At step 198, the connection pool can identify a connection by its shard keys, and allow re-use of connections when a request for a same shard key is received from a client application.

Building the Shard Key for a Connection Request

In accordance with an embodiment, shard-aware client applications can identify and build shard keys, and optionally a shard group, needed to fetch a connection to the sharded database, for example using a ShardKey or similar interface and builder which enables compound shard keys to be prepared with different data types:

subkey(Object subkey, java.sql.SQLTYPE subkeyDataType)

In accordance with an embodiment, multiple invocations can be made to the subkey( . . . ) method on the ShardKey builder, to build a compound shard key, where each subkey can be of different data type. The data type can be defined using an enumerator oracle.jdbc.OracleType, for example as a string and date compound shard key:

```
ShardKey shardKey = datasource
    createShardKeyBuilder( )
    subkey( <string>, oracle.jdbc.OracleType.VARCHAR2)
    subkey (<date>, oracle.jdbc.OracleType.DATE )
    build( );
```

In accordance with an embodiment, a select set of data types can be supported as keys, and corresponding validations provided in the builder to prevent unsupported data types. Exemplary data types can include OracleType.VARCHAR2; OracleType.CHAR; OracleType.NVARCHAR; OracleType.NCHAR; OracleType.NUMBER; OracleType.FLOAT; OracleType.DATE; OracleType.TIMESTAMP; OracleType.TIMESTAMP WITH LOCAL TIME ZONE; and OracleType.RAW.

Updating a Connect String with Shard Key Values

In accordance with an embodiment, when a connection is created using a listener for a connection request including one or more shard keys, the ShardKey interface converts the shard key to a corresponding BASE64 encoded string, so that the connect data will have the following two fields that are relevant to the database driver:

```
SHARD_KEY_B64 for base64 encoded binary representation of shard key
GROUP_KEY_B64 for base64 encoded binary representation of group key
```

Fields for base64-encoded values (*_B64) can have the following format:

```
...(CONNECT_DATA=(SHARD_KEY_B64= [version] [type] [int literal]
[int literal] ... ,[base64 binary],[base64 binary],
[base64 binary],...))...
```

In accordance with an embodiment, the connect string starts with a header with "version" number=1; followed by a "type" whose value can be defined as shown in Table 1.

TABLE 1

| | | |
|---|---|---|
| 0 | The string doesn't contain hash value. | Character values are encoded in |
| 1 | The string contains hash value. | AL32UTF8 (for varchar) and AL16UTF16 (for nvarchar) encodings. |
| 2 | The string doesn't contain hash value. | Character values are encoded in |
| 3 | The string contains hash value. | database encoding (which may be specific for each column). |
| 4 | The string contains only hash value. | |

In accordance with an embodiment, after the string type, a space-separated value "type identifiers" are provided (as decimal integer literals), as shown in Table 2.

TABLE 2

| | |
|---|---|
| 1 | VARCHAR, NVARCHAR, [CHAR, NCHAR = 96] |
| 2 | NUMBER |
| 12 | DATE |
| 23 | RAW |
| 180 | TIMESTAMP |
| 231 | TIMESTAMP WITH LOCAL TIME ZONE |

In accordance with an embodiment, the header is terminated by a comma, and is followed by a comma-separated list of base64 encoded values for each part of the compound shard key, wherein the data types can be encoded as follows:

NUMBER, FLOAT, DATE, TIMESTAMP, TIMESTAMP WITH LOCAL TIMEZONE: for these data types, a corresponding Oracle representation can be used to convert them into corresponding byte arrays before B64 encoding.

RAW, VARCHAR, CHAR: for the input strings from the user for these data types, the client can use AL32UTF8 character encoding before being B64 encoded.

NVARCHAR, NCHAR: for these data types, the AL16UTF16 encoding is recommended.

For example, the key ("US", "94002") can be encoded as:
 . . . (CONNECT_DATA=(SHARD_KEY_B64=1 1 2, VVM=, OTQwMDI=)) . . . .

Connection Checkout from the Connection Pool with a Known Shard Key

In accordance with an embodiment, when a connection is borrowed from the connection pool, a shard-aware client application can provide the shard key and the shard group key using a connection builder as described above, which can be provided, for example, with OracleDataSource and PoolDataSource:

```
Connection conn = dataSource
    createConnectionBuilder( )
    shardkey (<shard_key>)   //of type ShardKey
    shardGroupKey(<shard_group_key>)
    build( )
```

In accordance with an embodiment, the above API's ensure that the connection created or borrowed from the pool is connected to the correct shard and chunk, including that:

(1) All operations on this connection will be limited to the shard and the chunk specified by the key supplied during connection checkout; otherwise an error or exception will be thrown back to the application. Race condition will also result in exception during connection usage.

(2) The URL specified against this datasource should not already contain the shard keys, when using a getConnection API that explicitly specify shard keys for the request; else an exception will be returned back to the user.

Setting the Shard Key on an Existing or Checked-Out Connection

In accordance with an embodiment, a setShardKey or similar interface allows for setting of a shard key on a connection. When the application has not been able to provide one or more shard keys at the connection checkout time, the connection pool and database driver (e.g., UCP/JDBC) can also support the use of an API at the connection level, for example in an OracleConnection class:
    connection.setShardKey(<shard_key>,<shard_group_key>);

In accordance with an embodiment, the shard key and shard group key are of type ShardKey. When the above is called on a connection, one of the following is possible:

(1) One or more shard keys supplied in setShardKey matches the shard and the chunk that the connection was originally created on. In this case no further action is needed and the connection can be used as is.

(2) The shard key specified by the setShardKey API maps to a different "chunk" but on the same shard on which the connection was originally created on. In this case it is required to switch the connection to the correct chunk.

(3) The shard key specified by the setShardKey happens to be a different shard from the one on which the connection has been created. Hence a switch of the underlying physical connection to the correct shard is required before the connection can be used further.

In accordance with an embodiment, if the latter scenario is encountered when the database driver (e.g., JDBC) is used directly, without the pool, then an error is returned to the application indicating incorrect shard keys. The connection is still usable and can be used for performing operations on the original chunk that it was connected to before the setShardKey was called. If the setShardKey is successful, then all operation on this connection once the shard key is set will be limited to the shard and the chunk specified by the key supplied during setShardKey. Also, the application should ensure that there is no ongoing transaction on the connection when the setShardKey is called. If not, then an exception is thrown to the application indicating that setShardKey could not be completed.

In accordance with an embodiment, if a connection switch is imminent as in case (3), or a service switch needs to be done as in case (2), then all the open result sets, statement, large objects, streams, etc. on the connection, have to be closed.

Connection Checkout without Providing Shard Keys

In accordance with an embodiment, when an application does not provide a shard key at checkout from the connection pool or database driver (e.g., UCP/JDBC), before using the connection to execute single-shard queries, the query is directed to a coordinator shard that facilitates execution of such queries and returns the result to the application.

In accordance with an embodiment, once a connection is created through a listener, the connection pool (e.g., UCP) will attempt to extract an actual "chunk name" corresponding to the chunk, and "instance/shard name" on which the connection was created, and use this information to identify a connection in the pool.

The chunk name and instance/shard name information will be present in the context (SYS_CONTEXT) after connection creation, and can be updated if there is a "switch chunk" operation on that connection at any point. The chunk information can also be made part of a connection object in the pool, and can be used during lookup for best candidate connection to be returned to user at checkout, and also for connection processing in response to system status or notification events (e.g., from Oracle Fast Application Notification, FAN, or Runtime Connection Load Balancing, RLB, environments).

Connection Selection During Connection Borrow in the Connection Pool

In accordance with an embodiment, for every connection checkout request from the connection pool (e.g., UCP), the connection pool can use the chunk information stored with each connection in the pool to determine a best possible matching connection to return to the user in one of the following ways:

(1) Given the shard keys in the connection request, the connection pool can attempt to look up the matching chunk name for the keys in the shard topology which has so far been discovered by the pool. If the matching chunk name is not found, then the connection request is forwarded to the listener for a new connection to be created.

(2) Else the chunk name can be used to fetch a list of instances on which the chunk is present, using a connection selection algorithm, and a connection is chosen to one of these instances. This will ensure that the connection is created to an instance on which the chunk corresponding to the shard keys requested by the user.

(3) Once the connection is chosen, a chunk switch piggyback is made on the connection specifying the chunk name and the shard keys to be used in the current session. If a matching connection is not found, then a new connection is created by forwarding the request to the listener.

Failover/Resharding Event Handling

In accordance with an embodiment, the connection pool (e.g., UCP) can subscribe to failover events per service using a subscription string such as, for example:

("eventType=database/event/service/<service_name>")

For sharding support, the OracleDBTopology and the connection pool (e.g., UCP) can subscribe to receive types of events which correspond to chunk movement or splitting. The chunk level event subscription string can be, for example:

("eventType=database/event/service/chunk")

The chunk name can be a part of this event body. When a first connection is made to a particular chunk, the corresponding chunk name is read from the sys_context, and a chunk event subscription can be made to receive all chunk related events. In accordance with an embodiment, chunk subscription is not service based.

In accordance with an embodiment, any re-sharding effort or splitting of chunks on the server side, will give rise to corresponding chunk down notification events which have the chunk name specified in the event body, for example:

VERSION=1.0 event_type=CHUNK chunk=<chunk name>
instance=<instance name> host=<host> database=<db name>
db_domain=<db domain name> status=<UP|DOWN>
timestamp=<timestamp> timezone=<timezone>

In accordance with an embodiment, the connection pool (e.g. UCP) can update its sharding topology to be in sync with the recent chunk event:

(1) The connection pool will remove the corresponding "instance" information from the chunk placement information (i.e. the mapping of chunk to list of instances on which it is present).

(2) The shard key information for the chunk is not removed from the topology.

(3) When the chunk comes up on a known instance, the instance information for that chunk is added in the chunk placement table and the shard key topology cache updated with the shard key information for that chunk if it has changed.

(4) If the chunk comes up on an unknown instance, then the instance information is added to UCP topology and the chunk placement data and the entire shard key topology for that instance is fetched and placed in the shard key topology cache of the connection pool.

(5) The chunk UP events are not processed by the connection pool.

In accordance with an embodiment, when there is a need to split the chunks in a sharded database, the server will send the chunk Split events which will look like the following:

VERSION=1.0 event_type=CHUNK chunk=<chunk name>
instance=<instance name> host=<host> database=<db name>
db_domain=<db domain name> status=SPLIT
timestamp=<timestamp>
timezone=<timezone> newchunk=<new chunkname>
[hash=<split boundary hash value>]

In accordance with an embodiment, hash is applicable only in cases of automatic hash based sharding where the boundary corresponds to the high value of the first split chunk and the low value of the second split chunk). The connection pool (e.g., UCP) will need to process the chunk split event as follows:

(1) The instance name on which the split is received will be removed from the chunk placement data.

(2) The chunk name is now updated with a new version, since the chunk is now undergoing a split and the new chunks after split needs to be distinguished from the old chunk on replicas where the chunk is yet to split.

(3) Both the shard topology table and chunk placement table are updated with the new chunk name keeping all other data intact. This will ensure that the replicas that are yet to undergo the split will remain unaffected by the split and will continue to handle connection requests as before.

(4) When there are no existing connection to handle requests and new connections are created, if the connection is created to the newly split chunk, the new chunk names and its ranges are populated into the topology cache and at this point both the split/un-split chunks will be available to handle the connection requests for the key-ranges.

(5) This process continues until all the replicas have undergone the split in which case the old chunk name (updated version) will no longer have any instances, which is then cleaned up from both the chunk placement and shard key topology tables.

(6) For automatic sharding, in step (1) after the chunk split is received, the new chunk information with new ranges as specified by the hash value is update in the shard key topology table as well as the new chunk placement information is updated.

Runtime Connection Load Balancing (RLB) Requirements for Shared Pool

In accordance with an embodiment, for pools which have connections to the sharded databases, an RLB subscription can include that: the connection pool (e.g., UCP) will subscribe to the global service for RLB notifications from the GDS cluster. RLB events from a GDS database will be based on global services; hence when a global service RLB is received, to check the distribution pattern for each chunk that the pool is currently catering, the system can derive the RLB % applicable to that chunk, and then attempt connection distribution.

Chunk Placement Data for Sharded Databases

In accordance with an embodiment, a shard metadata information is created and maintained in the connection pool (e.g. UCP) that has a mapping of chunk name to the shard instances on which the service is available, and the priority of the chunk on that instance. In accordance with an embodiment, internally the data structure created will look as shown in table 3 for sharded databases:

TABLE 3

| Chunk Name | Shard Instance List |
|---|---|
| CHUNK_1_1 | [<Instance: dbs1%1, Priority: 0>, <Instance: dbs1%2, Priority: 0>] |
| CHUNK_1_10 | [<Instance: dbs1%1, Priority: 0>, <Instance: dbs1%2, Priority: 0>] |
| CHUNK_1_100 | [<Instance: dbs1%1, Priority: 0>, <Instance: dbs1%2, Priority: 0>] |
| CHUNK_1_11 | [<Instance: dbs1%1, Priority: 0>, <Instance: dbs1%2, Priority: 0>] |

Shard Key to Chunk Name Mapping for Sharded Databases

In accordance with an embodiment, apart from the service to shard list mapping, the system can include a mapping of shard key range/list or range to the chunk which corresponds to these shard keys. In accordance with an embodiment, shard grouping can be list or range based, when the sharding method is set to hash-based. In all other cases, shard groups are not supported. The following cases are possible as examples of the topology data, including, for hash based sharding and list based supersharding (Table 4):

TABLE 4

| <Group Key List, Shard key Hash Range> | Chunk Name |
|---|---|
| [gold, silver], {Low: 0, High: 42949672} | CHUNK_2_1 |
| [gold, silver], {Low: 42949672, High: 85899344} | CHUNK_2_2 |
| [regular, bronze], {Low: 0, High: 42949672} | CHUNK_1_100 |

For hash based sharding and range based supersharding (Table 5):

TABLE 5

| <Group Key Range, Shard Key HashRange> | Chunk Name |
|---|---|
| {1-10}, {Low: 0, High: 42949672} | CHUNK_2_1 |
| {1-10}, {Low: 42949672, High: 85899344 } | CHUNK_2_2 |
| [10-MAX], {Low: 0, High: 42949672} | CHUNK_1_100 |

For range based sharding, with no shard grouping (Table 6):

TABLE 6

| Shard Key Hash Range | Chunk Name |
|---|---|
| {Low: 0, High: 42949672} | CHUNK_2_1 |
| {Low: 42949672, High: 85899344} | CHUNK_2_2 |
| {Low: 85899344, High: MAX} | CHUNK_1_100 |

For list based sharding, with no shard grouping (Table 7):

TABLE 7

| Shard Key List | Chunk Name |
|---|---|
| [IN, AU] | CHUNK_2_1 |
| [US, CAN] | CHUNK_2_2 |
| [DE, UK] | CHUNK_1_100 |

Shard Metadata Cache

In accordance with an embodiment, the connection pool maintains a shard metadata cache that includes information learnt and collected as when new connections are created from the pool to different chunk and shards of a sharded database, for example:

(1) Shard key and shard group key ranges applicable to chunk to which the connection pool (e.g., UCP) has created a connection;

(2) Shard key column information such as database encoding if applicable;

(3) Sharding and shard grouping method (e.g., hash-based, list-based, range-based).

Building Topology on Create Connection

In accordance with an embodiment, when a new connection is created using the shard, the data from the LOCAL_CHUNK tables and sharding metadata, such as sharding type, and database encoding type, are extracted from the LOCAL_CHUNK_TYPES table and stored in the metadata cache on the client side. The chunk priority for each chunk on the instance is also read and stored on the client side.

Update Topology Based on Server Side Oracle Notification Service (ONS) Events

In accordance with an embodiment, the metadata cache can be kept in synchrony with the server side changes by processing all of the following database high-availability (HA) events and updating the corresponding data structures on the client side:

(1) For a global service member down event, or instance down event, the corresponding instance is removed from the instance list of the chunks that are impacted. If the chunk is not up on any other instance, the corresponding chunk data needs to be cleaned from the chunk metadata stored in the topology.

(2) For a global service down event, both the service and chunk related data need to be cleaned up.

(3) For a chunk down event, the corresponding impacted entries in the chunk information stored in the topology needs to be cleaned up.

Shard Key Lookup

In accordance with an embodiment, an internal method can be provided on the metadata cache that is of the format chunk (ShardKey shardKey, ShardKey groupKey) and is used to get the chunk name corresponding to one or more shard keys provided as parameters to this method. The ShardKey object can include methods that allow comparison and check equality of two shard keys.

Security

In accordance with an embodiment, to address security concerns with exposing the contents (shard keys and ranges) and location of different chunks in a sharded database, the system can support the use of specific "password protected roles" defined on the server for enabling the user access to the data in the tables, such as LOCAL_CHUNK_TYPE, LOCAL_CHUNK_COLUMNS, LOCAL_CHUNKs. Database users who use UCP or JDBC or building a custom connection pool and who wish to maintain connections (or pool) to the sharded database, and also want to build a client side topology snapshot of the sharded database, can have to have this role provisioned for them.

2. Access to Sharded Databases Using a Cache and Shard Topology

Figure 5:
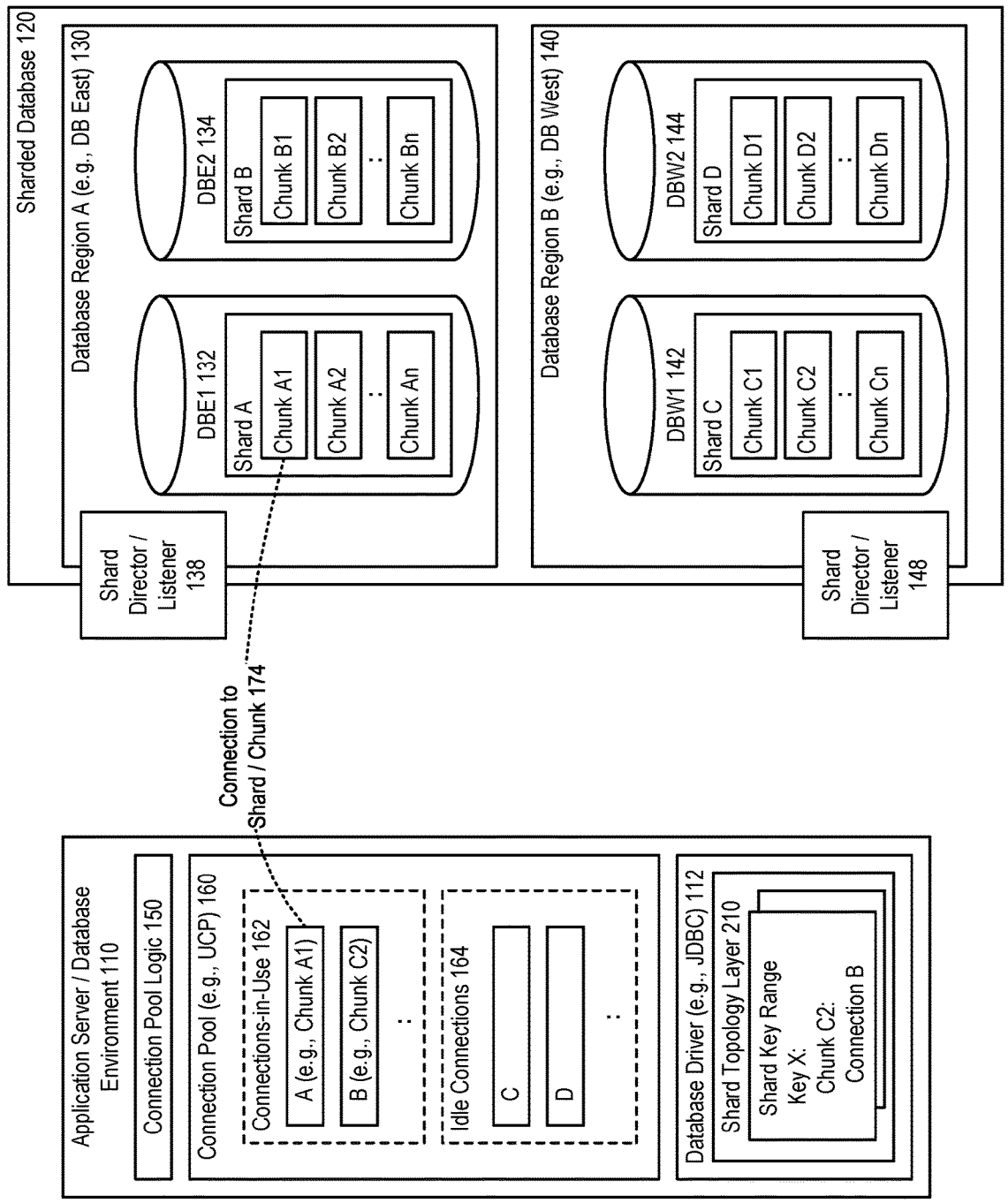
FIG. 5 illustrates a system for enabling access to a sharded database using a cache and a shard topology, in accordance with an embodiment.

In accordance with an embodiment, the system enables access to a sharded database using a cache and a shard topology. As new connections are created, a shard topology layer can be built at the database driver layer, which learns and caches shard key ranges to locations of shards. The shard topology layer enables subsequent connection requests from a client application to bypass a shard director or listener, and instead use a fast key path access to the appropriate shard or chunk. FIG. 5 illustrates a system for enabling access to a sharded database using a cache and a shard topology, in accordance with an embodiment.

As illustrated in FIG. 5, in accordance with an embodiment, and as described above, a shard-aware client application connecting to a sharded database can use a connection pool (e.g., UCP), to store or access connections to different shards or chunks of the sharded database within a shared pool.

As also described above, in accordance with an embodiment, the sharded database can comprise a first database region A (DBE), including sharded database instances "DBE 1" with shard A stored as chunks A1, A2, . . . An; and "DBE 2" with shard B stored as chunks B1, B2, . . . Bn; and a second database region B (DBVV), including sharded database instances "DBW 1" with shard C stored as chunks C1, C2, . . . Cn; and "DBW 2" with shard D stored as chunks D1, D2, . . . Dn.

As also described above, in accordance with an embodiment, each database region or group of sharded database instances can be associated with a shard director or listener component (e.g., GSM). An application can provide the shard key to UCP during the connection request, and, based on the shard key, the connection pool can route the connection request to the correct shard.

In accordance with an embodiment, as new connections are created, a shard topology layer 210 can be built at the database driver (e.g., JDBC) layer, which learns and caches shard key ranges to the location of each shard. A subsequent connection request can bypass the shard director or listener, and instead use a fast key path access to the appropriate shard or chunk.

Figure 6:
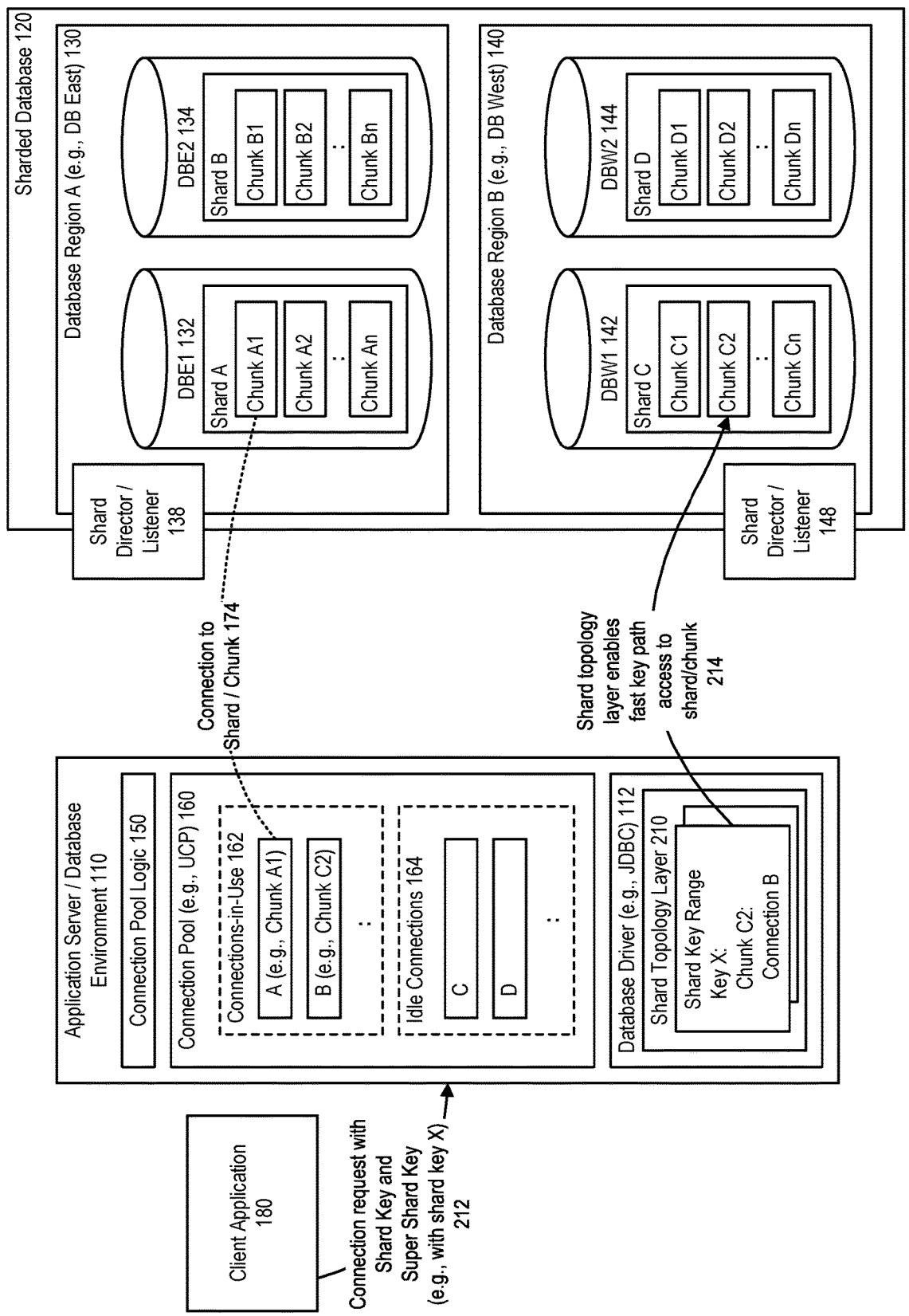
FIG. 6 further illustrates a system for enabling access to a sharded database using a cache and a shard topology, in accordance with an embodiment.

FIG. 6 further illustrates a system for enabling access to a sharded database using a cache and a shard topology, in accordance with an embodiment.

As illustrated in FIG. 6, a shard-aware client application can make a connection request with shard key and super shard key (e.g., with shard key X) 212. The shard topology layer enables fast key path access to a shard/chunk 214, including caching shard key ranges to the location of each shard.

Figure 7:
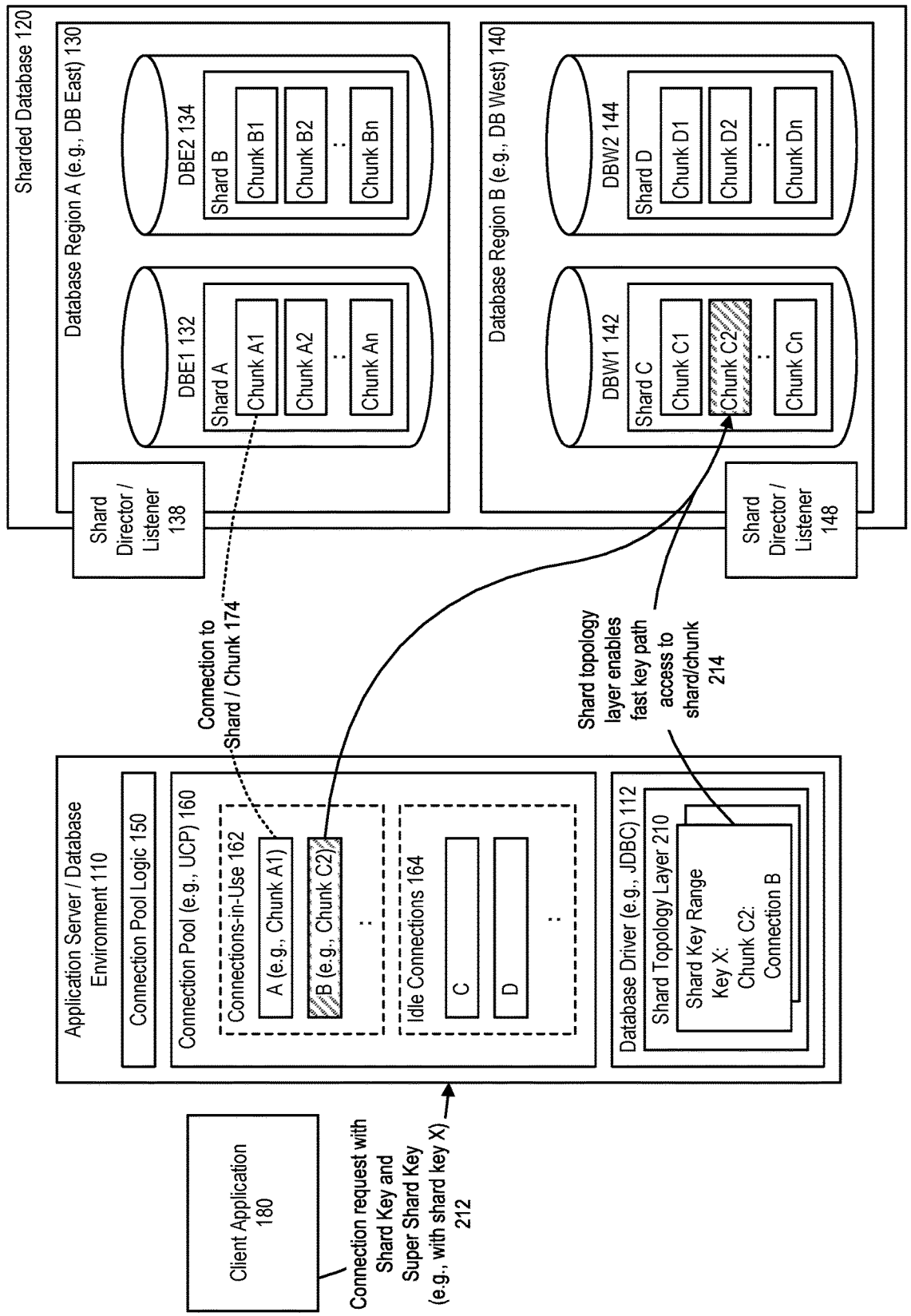
FIG. 7 further illustrates a system for enabling access to a sharded database using a cache and a shard topology, in accordance with an embodiment.

FIG. 7 further illustrates a system for enabling access to a sharded database using a cache and a shard topology, in accordance with an embodiment.

As illustrated in FIG. 7, in this example, the shard topology can be used to provide fast key path access by the shard-aware client application to, in this example, chunk C2, bypassing the shard director or listener.

GetConnection API Design

In accordance with an embodiment, exemplary API's defined on the OracleDatasource can include:

datasource. getConnectionToShard(<shard_key>)

which can be used when there is one level of sharding in the database and there is no super shard key involved. A connection can be obtained with a default user name and password that is set on the datasource. Shard key is a required parameter, and using the API with null or incorrect shard keys will result in an exception thrown back to the application.

datasource. getConnectionToShard (<shard_key>, <super_shard_key>, <user name>, <password>)

which can be used when the connection needs to be fetched or created for a specific set of shard keys or for a specific user. Shard key is a required parameter, and using the API with null or incorrect shard keys will result in an exception thrown back to the application. The super shard key can be null.

datasource. getConnectionToShard (<shard_key>, <super_shard_key>, <user name>, <password>, <label_properties>)

which can be used when the connection needs to be fetched or created for a specific set of shard keys or for a specific user, also matching the user-defined labels. Shard key is a required parameter, and using the API with null or incorrect shard keys will result in an exception thrown back to the application. The super shard key can be null.

Connection Creation and Retrieval with Shard Key

Figure 8:
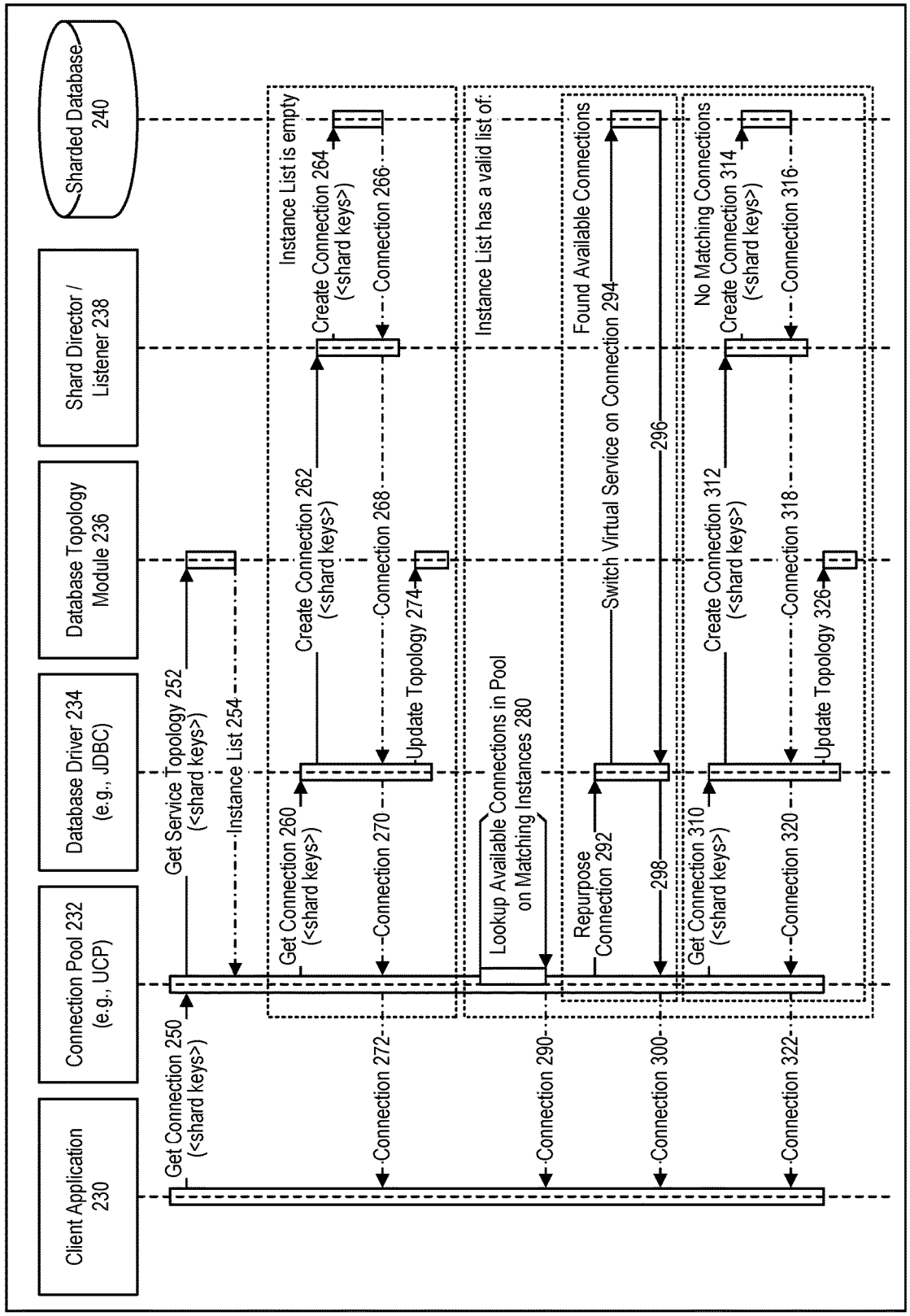
FIG. 8 illustrates a sequence diagram that describes the flow when a connection pool is used to create and maintain a pool of connections to a sharded database, in accordance with an embodiment.

FIG. 8 illustrates a sequence diagram that describes the flow when a connection pool is used to create and maintain a pool of connections to a sharded database, in accordance with an embodiment.

As illustrated in FIG. 8, in accordance with an embodiment, a connection pool (e.g., UCP) can be used to create and maintain a pool of connections to the sharded database, and to support use of a getConnectionToShard API call made against the PoolDatasource. For example, as illustrated, a client application 230 can utilize a connection pool 232 (e.g., UCP), database driver 234 (e.g., JDBC), and database topology module 236, together with a shard director or listener 238, to access a sharded database 240, and to support the use of a shard topology layer. When a client application makes a get connection request 250, optionally with one or more shard keys, the connection pool makes a get service topology request 252 to the database topology module, which can return an instance list 254.

In accordance with an embodiment, if the instance list is empty, then the connection pool can make a get connection request to the database driver 260, which calls the shard director or listener to create the connection 262. When the connection to the database is created 264, the connection is returned to the client application, 266, 268, 270, 272, and the shard topology updated accordingly 274.

Alternatively, if the instance list is not empty, the connection pool can make a lookup on available connections in the pool for matching instances 280, and return an appropriate connection to the client application 290.

In accordance with an embodiment, if the instance list has a valid list of found available connections, then the connection pool can repurpose an existing connection 292, and switch a virtual service on that connection 294. The repurposed connection can then be returned to the client application 296, 298, 300.

Alternatively, if the instance list has no matching connections, then the connection pool can, as described above, make a get connection request to the database driver 310, which calls the shard director or listener to create the connection 312. When the connection to the database is created 314, the connection is returned to the client application, 316, 318, 320, 322, and the shard topology again updated accordingly 326.

Figure 9:
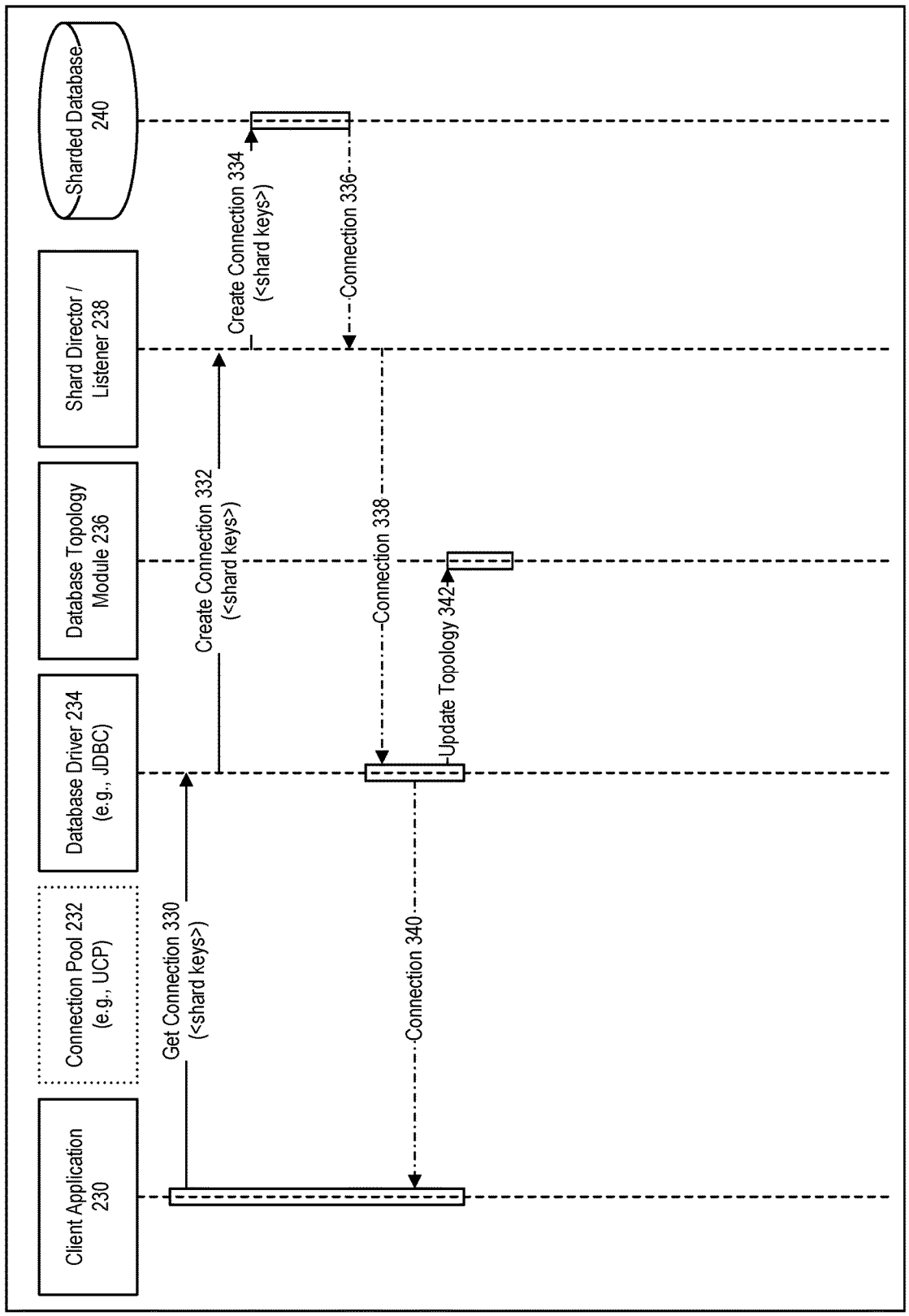
FIG. 9 illustrates a sequence diagram that describes the flow when applications use a database driver, without the connection pool, to fetch connections to a sharded database, in accordance with an embodiment.

FIG. 9 illustrates a sequence diagram that describes the flow when applications use a database driver, without the connection pool, to fetch connections to a sharded database, in accordance with an embodiment.

As illustrated in FIG. 9, in accordance with an embodiment, applications can use a database driver such as a JDBC driver, without the connection pool, to fetch connections to the sharded database. The connection request can bypass the shard director or listener and use a fast key path access to the appropriate shard or chunk.

As illustrated in FIG. 9 when a client application makes a get connection request 330 with one or more shard keys, the database driver can directly call the shard director or listener to create the connection 332, without requiring any input from the connection pool. When the connection to the database is created 334, the connection is returned to the client application, 336, 338, 340, and the shard topology updated accordingly 342.

Figure 10:
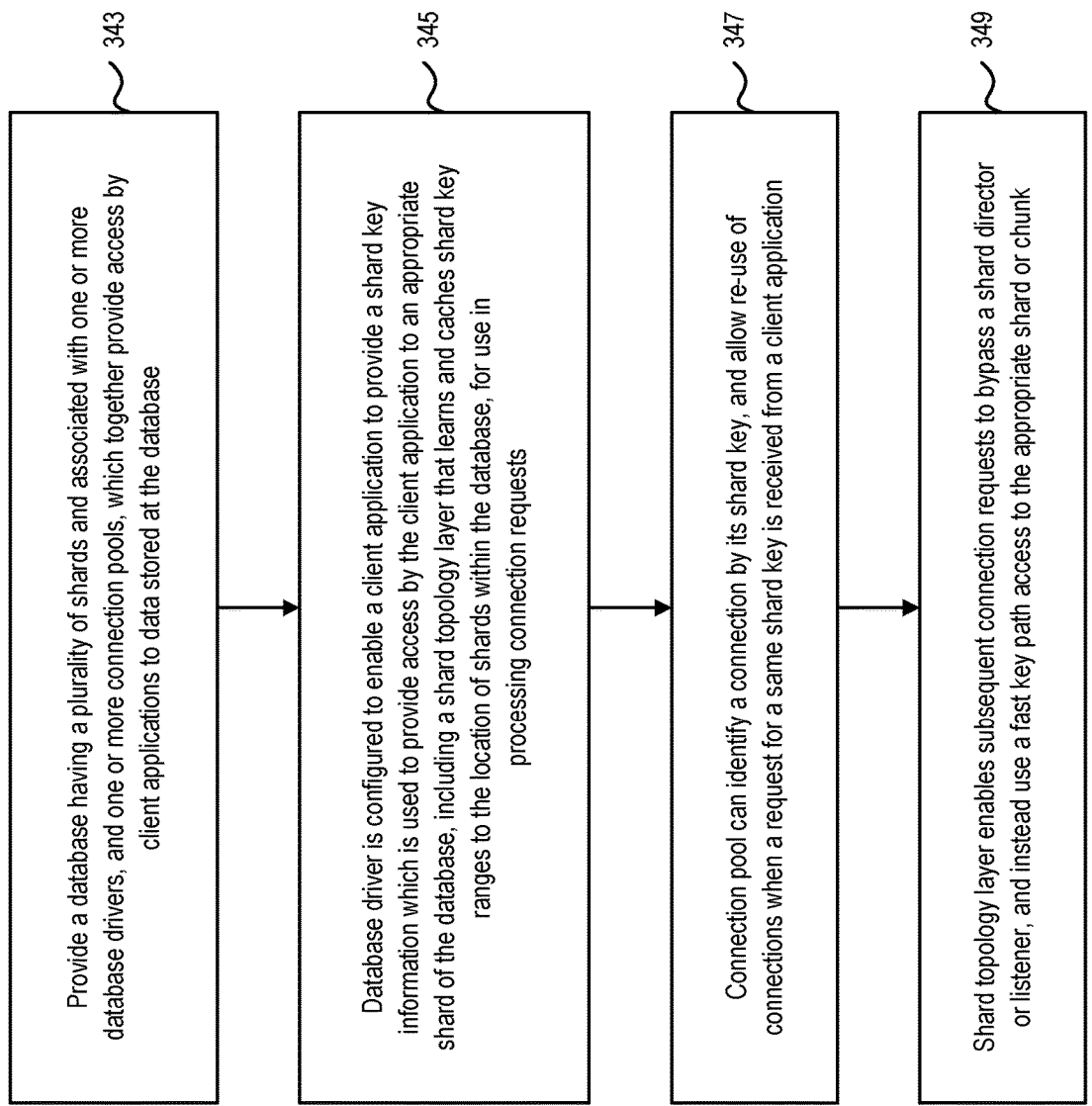
FIG. 10 illustrates a process for enabling access to a sharded database using a cache and a shard topology, in accordance with an embodiment.

FIG. 10 illustrates a process for enabling access to a sharded database using a cache and a shard topology, in accordance with an embodiment.

As illustrated in FIG. 10, at step 343, a database is provided having a plurality of shards and associated with one or more database drivers, and one or more connection pools, which together provide access by client applications to data stored at the database.

At step 345, the database driver is configured to enable a client application to provide a shard key information which is used to provide access by the client application to an appropriate shard of the database, including a shard topology layer that learns and caches shard key ranges to the location of shards within the database, for use in processing connection requests.

At step 347, the connection pool can identify a connection by its shard key, and allow re-use of connections when a request for a same shard key is received from a client application.

At step 349, the shard topology layer enables subsequent connection requests to bypass a shard director or listener, and instead use a fast key path access to the appropriate shard or chunk.

SetShardKey on Connection Through the Connection Pool (e.g., UCP)

In accordance with an embodiment, when a client application or user attempts to perform a setShardKey( . . . ) against a borrowed connection, the following operations are performed on the connection:

(1) If the shard key maps to a given range in the shard topology table, then the virtual service name against the key range is looked up. If the virtual service name is the same as the one that is on the connection, then the connection is created to the same chunk and can be re-used directly.

(2) If the shard key maps to the new virtual service that is present on the same instance as the one the connection has been created on, then the connection can be re-used by switching the service on the connection to the new virtual service. Before the connection's virtual service is switched, all the open artifacts on the connection needs to be closed, using the JDBC API's. If there is an ongoing transaction on the connection, the operation will fail with an exception provided to the user.

(3) If the shard key maps to a new virtual service, which exists on a different instance then the connection pool (e.g., UCP) needs to switch the physical connection underneath the proxied connection, for example by the following process: The connection returned to the application is a proxy connection object that represents the underlying physical connection. When the connection needs to be switched to a new shard instance, the connection pool first tries to find an existing connection in the pool that is created to the target virtual service name, otherwise it creates a new connection. The original connection that was wrapped in the proxy is returned back to the pool after closing all the open artifacts. If there is an ongoing transaction, this operation will result in an exception. The new connection is then associated with the proxy connection object, using a capability called setDelegate that changes the underlying physical connection under the proxy object. The user can continue to use the proxy object now, which now points to the shard and chunk as specified by the new keys in the setShardKey call.

SetShardKey on Connection Through the Database Driver (e.g., JDBC)

In accordance with an embodiment, when the user tries to do a setShardKey against the connection object using the database driver (e.g., JDBC), the following process can be followed:

(1) If the shard key maps to a given range in the shard topology table, then the virtual service name against the key range is looked up. If the virtual service name is same as the one that is on the connection, then the connection is created to the same chunk and can be re-used directly.

(2) If the shard key maps to the new virtual service that is present on the same instance as the one the connection has been created on, then the connection can be re-used by just switching the service on the connection to the new virtual service. Before the connection's virtual service is switched, all the open artifacts on the connection needs to be closed, using the database driver (e.g., JDBC) API's. If there is an ongoing transaction on the connection, the operation will fail with an exception provided to the user.

(3) If the shard key maps to a new virtual service, which exists on a different instance/shard, then a corresponding error message is returned to the user.

Connection Selection in the Connection Pool (e.g., UCP)

In accordance with an embodiment, a connection can be selected in the connection pool (e.g., UCP) using the following process:

(1) When a getConnection( . . . ) request is received at the pool with a shard key information, in order to get the service name corresponding to the shard key and the super shard key, the connection pool can call an API provided by the OracleDBTopology Module:

dbTopology.getServiceName (<shard_key>, <super_shard_key>)

(2) If the service name for this chunk is not available in OracleDBTopology yet, i.e. there has been no connection to that particular chunk, a new connection can be created to the shard using the listener. In this case, the connection string is modified to include the shard and super shard key and a connection creation request is made, to be handled by the listener. The database driver (e.g., JDBC) needs to handle getConnection (<shard_key>, <super_shard_key>) by updating the URL with these two keys, before trying to create the connection.

(3) If there is an existing valid mapping for the shard keys and a corresponding service name is returned by the above API, the connection pool will check if there is an already available connection to that service i.e. any connection that is already created to the same chunk or virtual service; and, if so the connection can be directly re-used.

(4) If there is no available connection in the connection pool for that service and there is room in the pool to grow, then a consideration can be made if a new connection needs to be created, or if an available connection can be repurposed to obtain a connection to the desired chunk.

(5) If in (4) it is decided to repurpose a connection, to choose the candidate for repurpose the below process can be followed: the connection pool (e.g, UCP) uses the OracleDBTopology API getServiceTopology (<service_name>) to get the list of instances on which the virtual service (chunk) is available. If the virtual service topology is not present, then the connection repurposing needs to be aborted and the system should try to create a new connection for the virtual service (chunk). If the virtual service topology is available, then get a list of instances that have the chunk corresponding to the virtual service; and choose the best instance to use to select a candidate connection for repurposing, e.g., using an RLB algorithm if enabled on the pool. On the instance/shard that is chosen in the previous step, get a list of all the available connections, and then choose the connection from a service which has the maximum number of available connections at this point, which is deemed to be the best candidate for repurpose. The candidate connection is then repurposed by switching the service on the connection and the connection is returned back to the user. If the switch service fails due to any reason, fall back to random algorithm for choosing an instance from the list of instances provided above, and then repeat the same process and try to repurpose a connection. If repurposing connection using the random algorithm fails for some reason, attempt to create a new connection to the chunk specified by the shard keys if there is room to grow in the pool, else an error is reported.

In accordance with an embodiment, using the getConnection that allow the users to pass in the connection labels as well as shard keys, connection labeling can be supported over and above the connection retrieval from the pool using shard keys. The usual connection selection includes selection by RLB and affinity first followed by labeling match (or cost). Wth sharding support, the system can first select the connections by shard keys (virtual service) and then by RLB/Affinity and connection labeling algorithm will be applied as usual.

Connection Storage and Lookup in the Connection Pool (e.g., UCP)

In accordance with an embodiment, once the connection is created, the connection pool (e.g., UCP) will attempt to extract the actual "service" name corresponding to the internal virtual service of the chunk on which the connection is created and place it in the connection request identifier for the connection. The connection request identifier will be used to look up and borrow connections with the correct service name (chunk) from UCP's connection storage. The service name will also be used to determine the best candidate connection for repurpose when a matching connection is not obtained in the pool and the connection service switch is imminent.

OracleDBTopology Module

Figure 11:
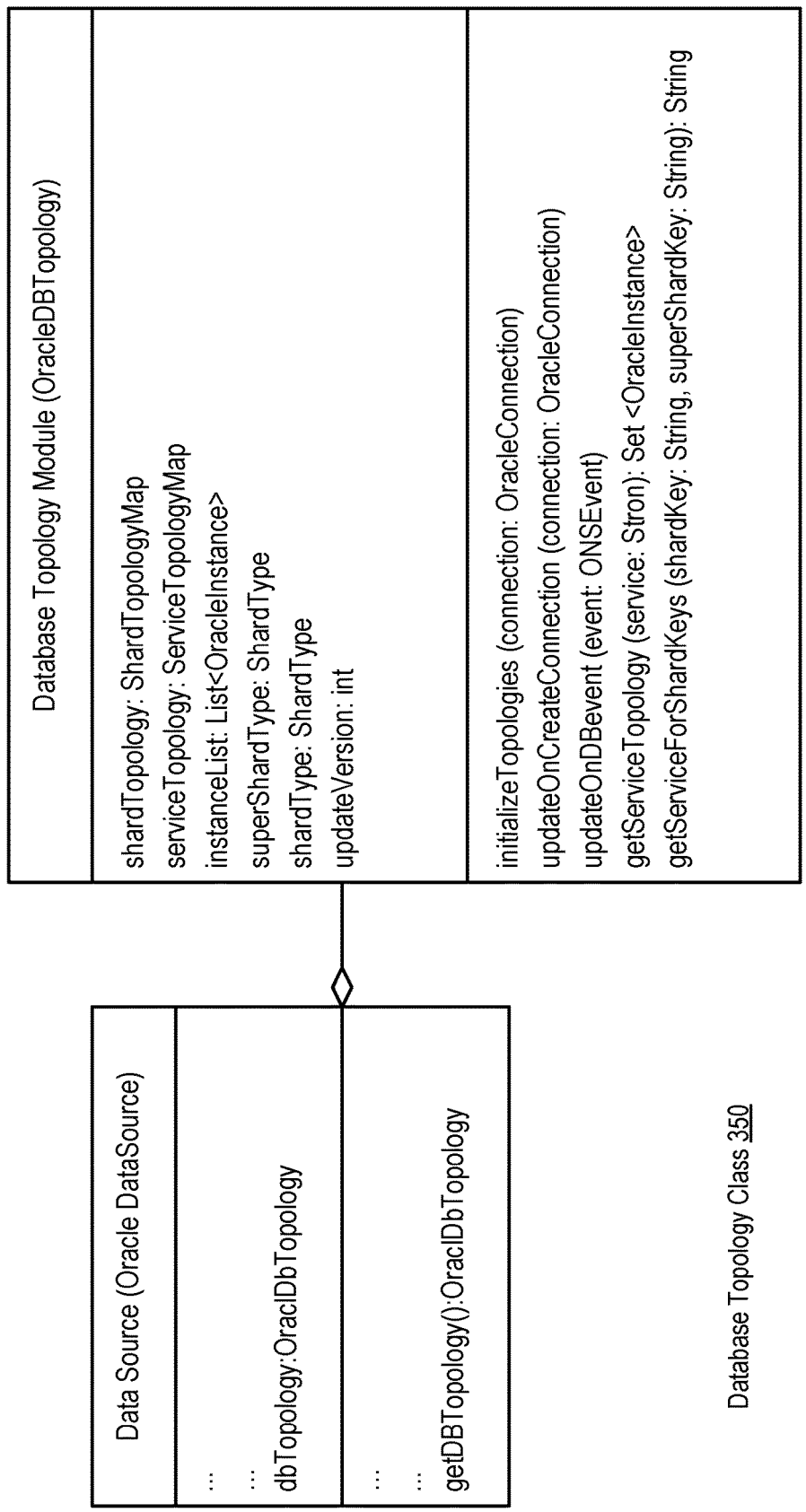
FIG. 11 illustrates a database topology class design, in accordance with an embodiment.

FIG. 11 illustrates a database topology class design 350, in accordance with an embodiment.

In accordance with an embodiment, an OracleDBTopology module can be placed within the database driver (e.g., JDBC), and contains all the topology data for the database, for example the service-to-instance mapping, and the shard key to service mapping for all services and shard keys referred to by the pool or by the application using the database driver.

In accordance with an embodiment, an instance OracleDBTopology instance is associated with an OracleDataSource instance and there is a 1:1 mapping between them. The operations and the data present in the OracleDBTopology can be used by: users of a database driver in order to lookup the shard or service topology; the connection pool (e.g., UCP) to route connection requests efficiently based on the cached topology; custom pool implementations which can leverage this module to allow the pool to use the topology data and maintain pool of connections to a sharded database.

In accordance with an embodiment, the OracleDBTopology can be initialized lazily when the first connection is created using the OracleDataSource using one of the getConnection ( ) API's, the connection object is used to get the required information for initializing the OracleDBTopology module. The connection created is used to lookup the table LOCAL_CHUNK_TYPES table. The columns SHARD_TYPE and the SUPER_TYPE are read to determine the sharding and the super-sharding methodology. These values are stored as a property in OracleDBTopology instance. A DEF_VERSION is also extracted and placed in the client side.

Service Topology

FIG. 12 illustrates a service topology class design 360, in accordance with an embodiment.

In accordance with an embodiment, the ServiceTopologyMap contains a map of 1:n mappings between the virtual service names to the list of instances that the service is currently running on. This map is populated incrementally as and when each connection is created and the method updatedOnCreateConnection( ) is called on the OracleDbTopology.

In accordance with an embodiment, both the virtual service name and instance name that the current connection is created on is present in the sys_context. On every new connection created, the system can check if the virtual service name is already in the map, and if not a new entry is added for the virtual service name and the instance. If the virtual service name is already in the map, and the instance name also is present in the instance list of the service, then no further action is needed; otherwise the instance is added to the instance list.

In accordance with an embodiment, a ShardTopologyMap provides an interface and defines a data structure that can be used to map a chunk key range or list, to the virtual service name.

Interfaces and APIs

In accordance with an embodiment, an exemplary application program interface (API) is described below, including a database driver (e.g., JDBC) API and a connection pool (e.g. UCP) API. In accordance with other embodiments and examples, other types of APIs or interfaces can be used.

Appendix A: Database Driver (e.g., JDBC) API

In accordance with an embodiment, an exemplary database driver (e.g., JDBC) API is described below. In accordance with other types of database drivers, other types of database driver API's or interfaces can be used.

Shard Key Interface

--- public interface ShardKey extends Comparable<ShardKey>{
/**
 * Used to compare two shard keys. If the shard keys are
 * compound the corresponding sub-keys in two keys will be
 * compared.
 *

-continued

```
    * @param o
    *     ShardKey to which this Shard key is to be compared.
    * @return -1, 0 or 1 as this ShardKey is less than, equal
    *     to, or greater than the shard key that is passed in
    *     as a method parameter
    * @see java.lang.Comparable#compareTo(java.lang.Object)
    */
    int compareTo(ShardKey o);
}
```

Connection Builder Interface

```
/**
 * Builder class for building connection objects with additional
 * parameters other than just the username and password. To use
 * the builder, the corresponding builder method needs to be called
 * for each parameter that needs to be part of the connection request
 * followed by a build( ) method. The order in which the builder
 * methods are called is not important. However if the same
 * builder attribute is applied more than once, only the most recent
 * value will be considered while building the connection. The
   builder's build( ) method can be called only once on a builder object.
 *
 * Example usage :
 *   OracleDataSource ods = new OracleDataSource( ) ;
 *   ..//set the required properties on the datasource
 *   Connection conn = ods . createConnectionBuilder( )
 *           .user("user")
 *           .password("password")
 *           .proxyClientName("proxy_client")
 *           .serviceName("service_name")
 *           .build( ) ;
 *
 * @param <B>
 *       Type of connection builder
 * @param <S>
 *       Type of connections created using this builder
 */
public interface ConnectionBuilder<B extends
ConnectionBuilder<B, S>, S>
        extends Builder<S> {
    /**
     * @param user
     * @return This connection builder object
     */
    B user(String user) ;
    /**
     * @param password
     * @return This connection builder object
     */
    B password(String password);
    /**
     * @param serviceName
     * @return This connection builder object
     */
    B serviceName(String serviceName);
    /**
     * @param shardKey
     *     Shard Key object that needs to be part of
     *     connection request
     * @return This instance of the connection builder.
     */
    B shardKey(ShardKey shardKey);
    /**
     * @param shardGroupKey
     *     Shard Group Key object that needs to be part of
     *     connection request
     * @return This instance of the connection builder.
     */
    B shardGroupKey(ShardKey shardGroupKey) ;
}
```

OracleConnectionBuilder

```
class oracle.jdbc.pool.OracleConnectionBuilder
    implements oracle.jdbc.ConnectionBuilder
    <OracleConnectionBuilder,Connection>
{
    //Oracle's Implementation class for ConnectionBuilder.
}
```

OracleDataSource

```
class oracle.jdbc.pool.OracleDataSource
{
    OracleConnectionBuilder createConnectionBuilder( ) { }
    OracleShardKeyBuilder createShardKeyBuilder( ) ;
}
```

OracleConnection

```
interface oracle.jdbc.OracleConnection
{
    /**
     * Used to check the validity of the connection and if the shard
     * keys passed to this method are valid for this connection.
     *
     * @param shardKey
     *     shard key to be validated against this connection
     * @param groupKey
     *     shard group key to be validated against
     *     this connection
     * @param timeout
     *     time in seconds before which the validation process is
     *     expected to be completed, else the validation process
     *     is aborted.
     * @return true if the connection is valid and the shard keys
     *     are valid to be set on this connection.
     * @throws SQLException
     *     if there is any exception while performing
     *     this validation.
     */
    boolean isValid (ShardKey shardKey, ShardKey groupKey,
    int timeout)
        throws SQLException;
    /**
     * Used to set the shard key and the shard group key
       on this connection.
     *
     * @param shardKey
     *     shard key to be set on this connection
     * @param groupKey
     *     shard group key to be set on this connection
     * @throws SQLException
     *     if there is an exception while setting the shard keys
     *     on this connection. In this case the connection
     *     will continue to be associated with the shard keys that
     *     was set on this connection before this method was called.
     */
    void setShardKey (ShardKey shardKey, ShardKey groupKey)
    throws SQLException;}
```

APPENDIX B

Connection Pool (e.g. UCP) API

In accordance with an embodiment, an exemplary connection pool (e.g. UCP) API is described below. In accordance with other types of connection pools, other types of connection pool API's or interfaces can be used.

UCP Connection Builder

```
/**
 * UCP's Connection Builder class for building connection
objects with additional parameters
 *  other than just the username, password and labels. To use the builder,
 *  the corresponding builder method needs to be called for each
 *  parameter that needs to be part of the connection request followed by
 *  a build( ) method. The order in which the builder methods are
 *  called is not important. However if the same builder attribute is
 *  applied more than once, only the most recent value will be
 *  considered while building the connection. The builder's build( )
 *  method can be called only once on a builder object.
 *
 * Example usage :
 * PoolDataSource pds = PoolDataSourceFactory.getPoolDataSource( ) ;
 * ..//set the required properties on the datasource
 *
 * Connection conn = pds.createConnectionBuilder( )
 *      .user("user")
 *      .password("password")
 *      .serviceName("service_name")
 *      .build( );
 *
 * @param <C>
 *      Type of connections created using this builder
 * @param <B>
 *      Type of connection builder
 */
public interface oracle.ucp.jdbc.UCPConnectionBuilder extends
    oracle.jdbc.ConnectionBuilder<UCPConnectionBuilder,
    Connection> {
/**
 * Sets the user attribute on the builder
 *
 * @param user
 *          - the database user on whose behalf the connection is
            being made
 * @return - this builder object
 */
@Override
public UCPConnectionBuilder user(String user) ;
/**
 * Sets the password attribute on the builder
 *
 * @param password
 *          - the user's password
 * @return - this builder object
 */
@Override
public UCPConnectionBuilder password(String password) ;
/**
 * Sets the labels attribute on the builder
 *
 * @param labels
 *          - The requested connection labels.
 * @return - this builder object
 */
public UCPConnectionBuilder labels(Properties labels) ;
/**
 * @param serviceName to retrieve the connection
 * @return this connection builder instance
 */
public UCPConnectionBuilder serviceName(String serviceName);
/**
 * @param shardKey
 *          Shard Key object that needs to be part of connection request
 * @return This instance of the connection builder.
 */
public UCPConnectionBuilder shardKey(ShardKey shardKey) ;
/**
 * @param shardGroupKey
 *          Shard Group Key object that needs to be part of
            connection request
 * @return This instance of the connection builder.
 */
public UCPConnectionBuilder shardGroupKey
    (ShardKey shardGroupKey);
```

```
/**
 * @return Connection built considering the builder attributes
 * @throws SQLException if there is a failure in building
    the connection.
 */
public Connection build( ) throws SQLException;
/**
 * Sets the labels attribute on the builder
 *
 * @param labels
 *          - The requested connection labels.
 * @return - this builder object
 */
ConnectionBuilder labels(Properties labels);
}
```

PoolDataSource Interface

```
Interface oracle.ucp.jdbc.PoolDataSource
{
/**
 *@return UCPConnectionBuilder that can help build Connection with
 *    multiple parameters other than just the user,password and labels.
 */
public UCPConnectionBuilder createConnectionBuilder( );
/**
 * @return OracleShardKeyBuilder that can help build Shard Keys.
 */
public OracleShardKeyBuilder createShardKeyBuilder( );
}
```

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing access to a sharded database, comprising:
a computer, including a processor;
an application server or database environment which provides access to a sharded database having a plurality of shards by which data is stored and presented, wherein the sharded database comprises a first database region including a first plurality of sharded database instances with shards stored as chunks therein, and a second database region including a second plurality of sharded database instances with shards stored as chunks therein, and wherein the sharded database is associated with
a database driver, and
a connection pool which creates and maintains a pool of connections for use with the database;
wherein each database region or plurality of sharded database instances therein is associated with a director or listener component that operates to provide access by software client applications to database shards at that database region;
wherein the connection pool and database driver operate together to provide access by client applications to data stored at the database, using the connections, including that, as new connections are created, a shard topology is built wherein the database driver caches shard key ranges to locations of shards within the database;
wherein the connection pool and database driver are configured to enable a client application to provide, in association with a connection request, a shard key information during at least one of a checkout of a connection to the database, or at a later point in time; and
wherein the shard key information and a chunk information stored with each connection maintained by the connection pool is then used by the system to provide access by the client application to a shard of the database, for use by the client application, including wherein the connection pool and database driver recognizes a shard key specified by the client application, the client application is provided with a connection to a shard and chunk associated with that client application.

2. The system of claim 1, wherein the database driver and connection pool are configured to recognize shard keys specified by the client application, and enable the client application to connect to a specific shard and chunk associated with that client application.

3. The system of claim 1, wherein the connection pool is configured to identify a connection by one or more shard keys associated with the connection, and to allow re-use of the connection when a request for the one or more shard keys is received from a client application.

4. The system of claim 1, wherein, if there are no connections in the connection pool to a particular shard or chunk then an attempt is made to repurpose an existing available connection to another chunk and re-use that connection.

5. A method of providing access to a sharded database, comprising:
providing, by a computer, access to a database having a plurality of shards by which data is stored and presented, wherein the sharded database comprises a first database region including a first plurality of sharded database instances with shards stored as chunks therein, and a second database region including a second plurality of sharded database instances with shards stored as chunks therein, and wherein the sharded database is associated with
a database driver, and
a connection pool which creates and maintains a pool of connections for use with the database;
wherein each database region or plurality of sharded database instances therein is associated with a director or listener component that operates to provide access by software client applications to database shards at that database region;
wherein the connection pool and database driver operate together to provide access by client applications to data stored at the database, using the connections, including that, as new connections are created, a shard topology is built wherein the database driver caches shard key ranges to locations of shards within the database;
wherein connection pool and database driver are configured to enable a client application to provide, in association with a connection request, a shard key information during at least one of a checkout of a connection to the database, or at a later point in time; and
wherein the shard key information and a chunk information stored with each connection maintained by the connection pool is then used by the system to provide access by the client application to a shard of the database, for use by the client application, including wherein the connection pool and database driver recognizes a shard key specified by the client application, the client application is provided with a connection to a shard and chunk associated with that client application.

6. The method of claim 5, wherein the database driver and connection pool are configured to recognize shard keys specified by the client application, and enable the client application to connect to a specific shard and chunk associated with that client application.

7. The method of claim 5, wherein the connection pool is configured to identify a connection by one or more shard keys associated with the connection, and to allow re-use of the connection when a request for the one or more shard keys is received from a client application.

8. The method of claim 5, wherein, if there are no connections in the connection pool to a particular shard or chunk then an attempt is made to repurpose an existing available connection to another chunk and re-use that connection.

9. A non-transitory computer readable storage medium, including instructions stored thereon which when read and executed by one or more computers cause the one or more computers to perform the steps comprising:
providing, by a computer, access to a database having a plurality of shards by which data is stored and presented, wherein the sharded database comprises a first database region including a first plurality of sharded database instances with shards stored as chunks therein, and a second database region including a second plurality of sharded database instances with shards stored as chunks therein, and wherein the sharded database is associated with
a database driver, and
a connection pool which creates and maintains a pool of connections for use with the database;
wherein each database region or plurality of sharded database instances therein is associated with a director or listener component that operates to provide access by software client applications to database shards at that database region;

wherein the connection pool and database driver operate together to provide access by client applications to data stored at the database, using the connections, including that, as new connections are created, a shard topology is built wherein the database driver caches shard key ranges to locations of shards within the database;

wherein the connection pool and database driver are configured to enable a client application to provide, in association with a connection request, a shard key information during at least one of a checkout of a connection to the database, or at a later point in time; and wherein the shard key information and a chunk information stored with each connection maintained by the connection pool is then used by the system to provide access by the client application to a shard of the database, for use by the client application, including wherein the connection pool and database driver recognizes a shard key specified by the client application, the client application is provided with a connection to a shard and chunk associated with that client application.

10. The non-transitory computer readable storage medium of claim 9, wherein the database driver and connection pool are configured to recognize shard keys specified by the client application, and enable the client application to connect to a specific shard and chunk associated with that client application.

11. The non-transitory computer readable storage medium of claim 9, wherein the connection pool is configured to identify a connection by one or more shard keys associated with the connection, and to allow re-use of the connection when a request for the one or more shard keys is received from a client application.

12. The non-transitory computer readable storage medium of claim 9, wherein, if there are no connections in the connection pool to a particular shard or chunk then an attempt is made to repurpose an existing available connection to another chunk and re-use that connection.

13. The system of claim 1, wherein the connection pool identifies the connection to a particular shard or chunk by shard keys associated with that connection, and controls re-use of the connection when a request for a same shard key is received from the client application.

14. The system of claim 1, whereupon the client application does not provide a shard key in association with the connection request, or the connection pool or database driver does not have a mapping for a provided shard key, the connection request is forwarded to a shard director or listener associated with the database.

15. The system of claim 1, wherein a shard key interface is provided that client applications use to identify shard keys or shard groups to fetch a particular connection to the sharded database.

16. The system of claim 1, whereupon receipt of the connection request, the connection pool determines a matching connection to return, including at least one of:
based on the shard key information in the connection request, attempt to look up a matching shard or chunk name in the shard topology, and associated connection; or
fetch, based on the shard or chunk name, a list of database instances on which the shard or chunk is present, and select a connection to one of those database instances.

17. The method of claim 5, wherein the connection pool identifies the connection to a particular shard or chunk by shard keys associated with that connection, and controls re-use of the connection when a request for a same shard key is received from the client application.

18. The method of claim 5, whereupon the client application does not provide a shard key in association with the connection request, or the connection pool or database driver does not have a mapping for a provided shard key, the connection request is forwarded to a shard director or listener associated with the database.

19. The method of claim 5, wherein a shard key interface is provided that client applications use to identify shard keys or shard groups to fetch a particular connection to the sharded database.

20. The method of claim 5, whereupon receipt of the connection request, the connection pool determines a matching connection to return, including at least one of:
based on the shard key information in the connection request, attempt to look up a matching shard or chunk name in the shard topology, and associated connection; or
fetch, based on the shard or chunk name, a list of database instances on which the shard or chunk is present, and select a connection to one of those database instances.

* * * * *

UNITED STATES PATENT AND TRADEMARK OFFICE
CERTIFICATE OF CORRECTION

| | |
|---|---|
| PATENT NO. | : 11,636,075 B2 |
| APPLICATION NO. | : 15/133972 |
| DATED | : April 25, 2023 |
| INVENTOR(S) | : Hegde et al. |

It is certified that error appears in the above-identified patent and that said Letters Patent is hereby corrected as shown below:

In the Specification

In Column 17, Line 40, delete "Wth" and insert -- With --, therefor.

Signed and Sealed this
Twentieth Day of February, 2024

Katherine Kelly Vidal
*Director of the United States Patent and Trademark Office*